(12) United States Patent
Ponticelli, Sr. et al.

(10) Patent No.: US 10,940,984 B2
(45) Date of Patent: Mar. 9, 2021

(54) BATTERY POWERED KEYLESS LOCKING CAP

(71) Applicant: Robert Joseph Ponticelli, Sr., Tucson, AZ (US)

(72) Inventors: Robert Joseph Ponticelli, Sr., Tucson, AZ (US); Robert Joseph Ponticelli, Jr., Tucson, AZ (US); Alex James Dmitroff, Tucson, AZ (US)

( * ) Notice: Subject to any disclaimer, the term of this patent is extended or adjusted under 35 U.S.C. 154(b) by 60 days.

(21) Appl. No.: 16/350,292

(22) Filed: Oct. 29, 2018

(65) Prior Publication Data
US 2020/0130908 A1    Apr. 30, 2020

Related U.S. Application Data

(60) Provisional application No. 62/707,392, filed on Oct. 31, 2017.

(51) Int. Cl.
| | |
|---|---|
| *E05B 47/00* | (2006.01) |
| *B65D 55/10* | (2006.01) |
| *B60K 15/04* | (2006.01) |
| *G07C 9/00* | (2020.01) |
| *B65D 53/02* | (2006.01) |

(52) U.S. Cl.
CPC .......... *B65D 55/10* (2013.01); *B60K 15/0409* (2013.01); *B65D 53/02* (2013.01); *E05B 47/0001* (2013.01); *E05B 47/0012* (2013.01); *G07C 9/00817* (2013.01); *B60K 2015/0416* (2013.01); *E05B 47/0004* (2013.01); *G07C 2009/00833* (2013.01)

(58) Field of Classification Search
CPC ..... B65D 55/10; B65D 53/02; E05B 47/0001; E05B 47/0012; G07C 9/00817; G07C 2009/00833; B60K 15/0409; B60K 2015/0416; Y10T 70/7068
See application file for complete search history.

(56) References Cited

U.S. PATENT DOCUMENTS

| | | | | |
|---|---|---|---|---|
| 5,933,086 A | * | 8/1999 | Tischendorf | E05B 47/068 340/5.22 |
| 6,225,153 B1 | * | 5/2001 | Neblett | B60L 50/66 438/188 |
| 7,997,106 B2 | * | 8/2011 | Mahaffey | E05B 73/00 70/58 |

(Continued)

*Primary Examiner* — Michael C Zarroli
(74) *Attorney, Agent, or Firm* — Eugene Vamos

(57) ABSTRACT

Battery powered, keyless locking container cap configured securing a bayonet filler neck or threaded filler neck remaining unlocked after attachment. A timer circuit powers off placing the invention into an energy saving, mode; a compression spring forces a coupler into engagement. While engaged, the cap can be removed and replaced. Cap rotation by an unauthorized user, locks the cap. A backup, rotary pin coded lock is in the interior inaccessible. Cap rotation enters a pin code to unlock or lock the cap. The invention supplied is with a transmitter configured as a key fob or a cigarette lighter power plug. the transmitter signals the cap not to lock thereby providing removal. rotational Comprising rotary frictional slippage prevents unauthorized removal by limiting both speed and the rotational force to a level insufficient to override the attachment torque.

28 Claims, 27 Drawing Sheets

(56) References Cited

U.S. PATENT DOCUMENTS

| | | | | |
|---|---|---|---|---|
| 8,398,436 | B2* | 3/2013 | Fischer | H01R 13/621 |
| | | | | 439/540.1 |
| 10,619,382 | B2* | 4/2020 | Waugh | E05B 65/0075 |
| 2006/0219497 | A1* | 10/2006 | Organek | B60R 25/02147 |
| | | | | 188/161 |
| 2010/0097223 | A1* | 4/2010 | Kruest | E05B 47/0011 |
| | | | | 340/572.1 |
| 2014/0260450 | A1* | 9/2014 | Dewalch | E05B 65/0089 |
| | | | | 70/277 |
| 2015/0376916 | A1* | 12/2015 | Roatis | E05C 3/042 |
| | | | | 70/277 |

\* cited by examiner

FIG. 11
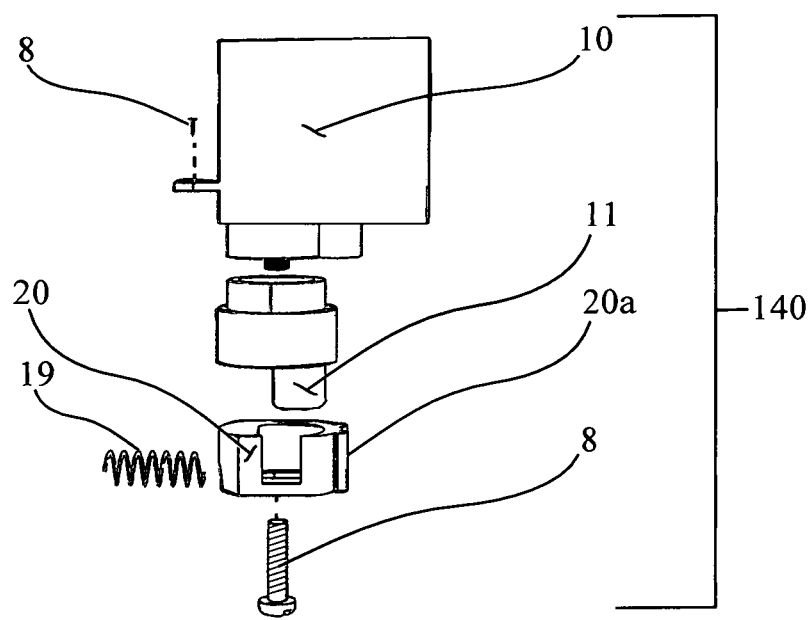
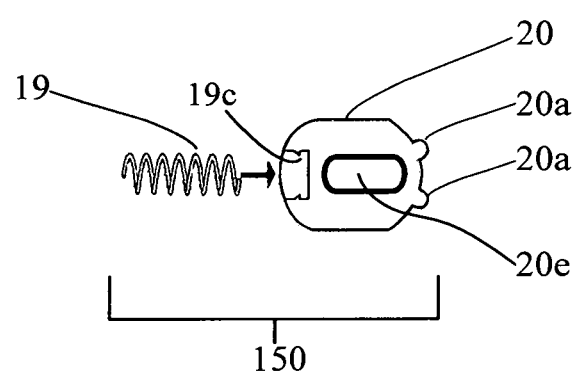
FIG. 11a

FIG. 25
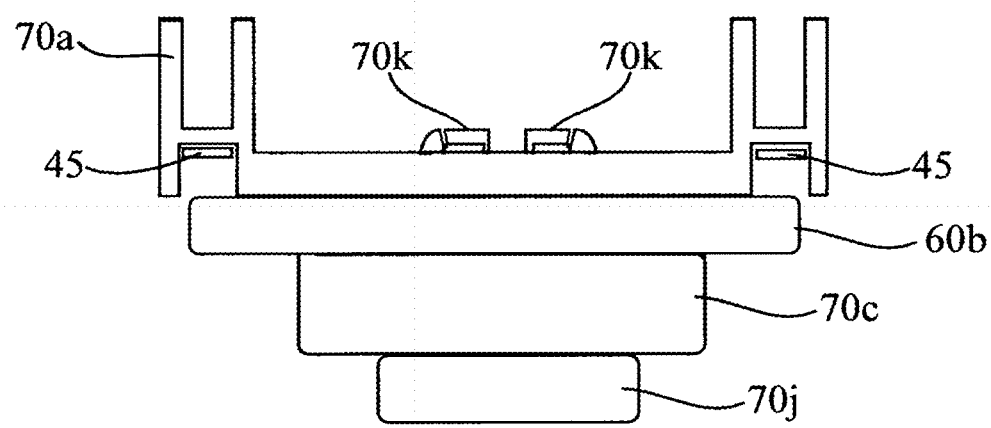
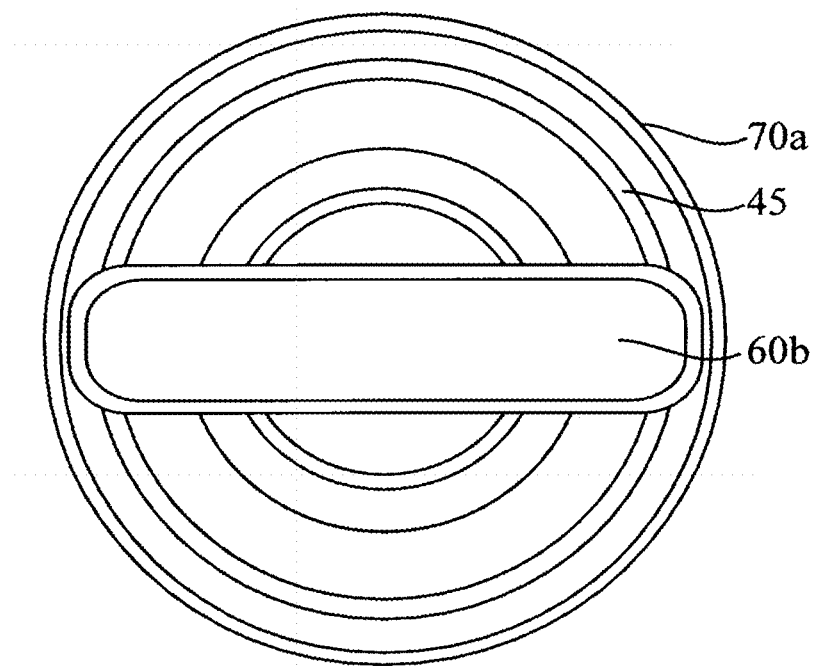
FIG. 26

BATTERY POWERED KEYLESS LOCKING CAP

FIELD OF THE INVENTION

The present invention relates to battery powered keyless locking caps comprising of either a bayonet type or a threaded type attachment for use on containers for water, diesel fuel and hydraulic fluid that only frictionally rotate 360 degrees when locked.

SUMMARY

In accordance with the principle aspects of the present disclosure; a keyless, battery powered rotary pin coded locking cap with a built-in receiver and a remote transmitter with functions that are controlled by an onboard controller for a lock that is normally left in an unlocked mode consisting of a bayonet type attachment to a bayonet receiver or configured to fit a threaded type attachment for attachment to a threaded receiver that includes an inner housing configured to engage the attachment device and an outer housing cap devoid of any broken surfaces, holes, or means to gain physical entrance to the interior and without any visible dials or means used to unlock the cap comprising of a concealed built-in, inaccessible unlocking mechanism consisting of the cap, the cap configured with magnets to enter a rotary entered pin code which is entered by rotating the cap past opposing field magnetically tripped switches strategically placed around the perimeter of the inner and outer housing. Direct access to the lock is totally interrupted. To enter the correct pin code, the outer cap is rotated left or right to a stop position repeatedly and each time the stop position is reached the controller receives a pulse. This is repeated until a recognized set of pulses is achieved. The method to enter the pin code will become clear in the following description of the drawings area. The cap having a continuous unbroken and uninterrupted outer surface gives no indication to an unwanted user that the cap has a locking provision. Unwanted attempts to remove the cap or a slight rotation of the cap trigger the controller to instantly lock the cap. However, when the remote transmitter, for example mounted inside of a vehicle, is activated, an encoded signal is sent to the receiver in the lock that prevents the locking sequence and thereby allows wanted cap removal. The cap comprises a groove on the underside adjacent to the lid of the upper lock housing with a dowel pin suitably positioned in the lid of the lock housing for fitment into said groove. Attached to the lock housing lid is a spring that returns the cap to a default position. The pre-determined stop positions of the groove prescribe the amount of rotation. An 0 ring suitably positioned between the lock housing and lower attachment housing provides enough torque to rotate the cap about 8.9 pounds of torque. An exclusive, clever embodiment and a nuance in the field of locking cap herein referred to as frictional slippage.

During disengagement, frictional slippage allows the dowel pin to reach the end point of the slot but, lacking in sufficient torque to unscrew the cap thereby allowing the cap to only frictionally rotate about the axis of the inner housings. An electronic coupler consisting of an independently acting compression spring loaded coupling device is located inside the inner housing. The dowel pin works in accord with the coupler and the coupler with the dowel pin thereby becoming an innovative dual action coupler. To remove the cap, the coupling spring must be in the extended position $1^{st}$ position while the cap is rotated positioning the dowel pin against the end of the slot $2^{nd}$ position. Both conditions must be met to remove or replace the cap. The outer housing moves relative to the inner housing when disposed in the engaged position. The outer housing and the inner housing are operatively coupled in the engaged position. When not in use, the independent spring loaded and specifically locating coupler automatically functions to position the invention in the unlocked mode at all times. When in the unlocked mode, power is turned off energy is saved thereby increasing battery life. Moreover, a low profile default spring is suitably positioned keeping the outer housing located away from the power switches so that the power remains off.

BRIEF DESCRIPTION OF THE DRAWINGS

FIG. 07 is the remote operated circuitry of a transmitter circuit of the RF transmitter 13a.

FIG. 11 depicts a servo 10, a universal spline adaptor 11, coupler 20a, mounting screws, 8 and constant tension compression spring 19.

FIG. 11a depicts a view of the independently forced operating, spring loaded, slotted coupler 20.

FIG. 25 is a side view of the assembled interchangeable bayonet attachment part of the invention.

FIG. 26 is a bottom view of the bayonet attachment adaptor of FIG. 25 showing latching arm 60b that rotates during attachment to a bayonet type filler neck.

DETAILED DESCRIPTION OF THE DISCLOSURE

Figure 1:
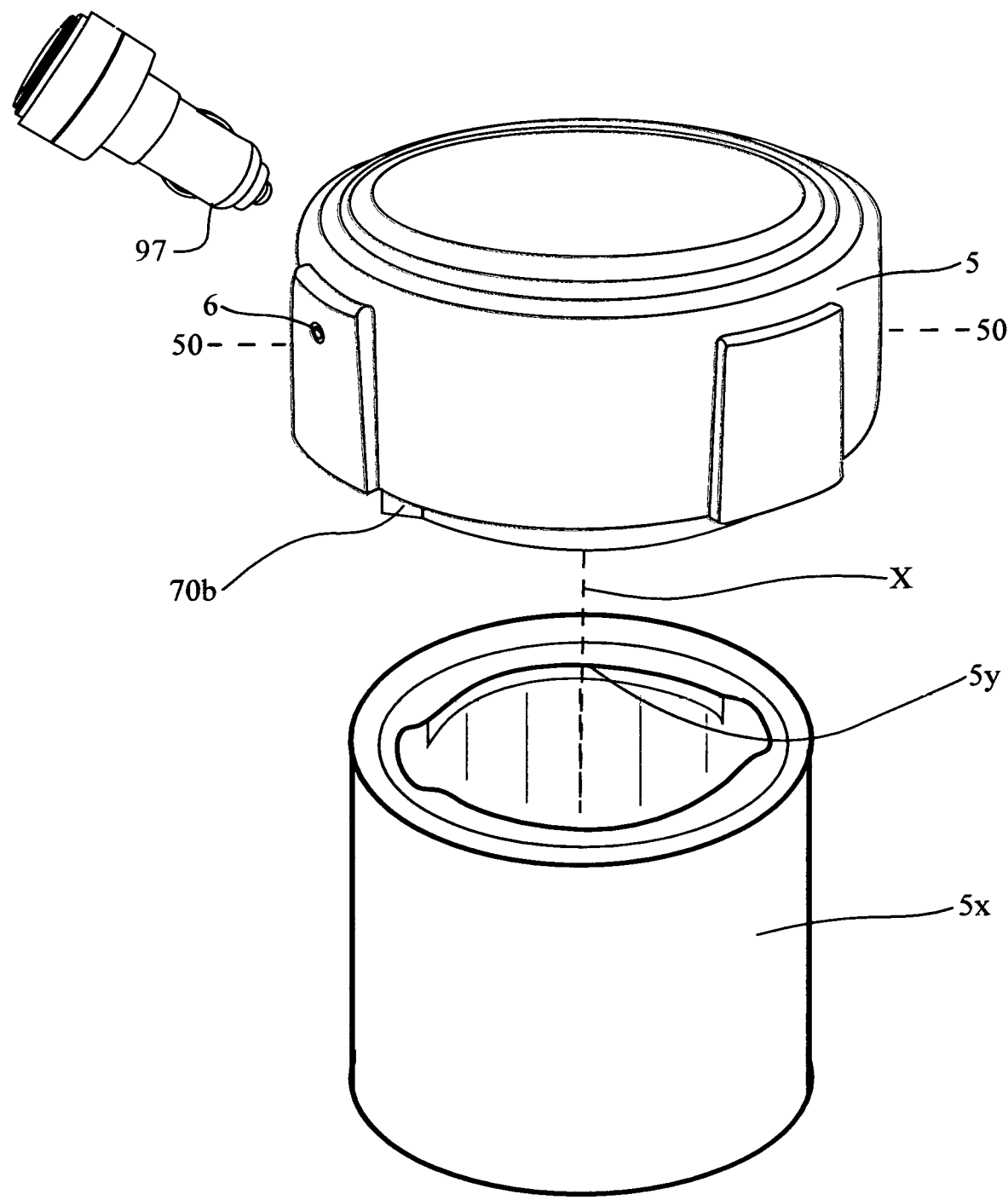
FIG. 01 is a perspective view of locking cap 5 for attachment to a bayonet filler neck according to a first embodiment further depicting a perspective view of an RF transmitter configured as a cigarette lighter plug.

There has long been a need for a safe low voltage wireless lock which can be operated without the use of a key or combination wheels or exterior placed combination type mechanism. The long standing technology of key operated locks has many disadvantages which discourage their use. This is particularly true in the transportation industry and many other industries which utilize storage tanks that utilize some sort of removable cap when filling the tank.

Among these disadvantages are broken or lost keys, jammed keyways, frozen water ingress into the keyway, the changing of drivers on big rigs, key logistics. In short, it is a nightmare for large Heavy Duty Fleets to protect against fuel theft. The cost of downtime appears to be greater than the cost of lost fuel. For this reason, large fleets refuse to use locking fuel caps. As an example, when calculated for one year, a fleet of 1000 Heavy Duty trucks can lose 3 to 5% of their fuel to theft; this loss can actually approach 2.5 million dollars which has to be written off.

Other disadvantages are that locking caps can be what the industry calls wrenched off. This is the use of a large pipe wrench with an extension handle to force off a locked cap. In the process, the damage to the fuel tank can be extensive. One of the embodiments of the present invention is to have a cap that only frictionally rotates around an inner housing when locked thus preventing the wrenching off nightmare.

It seems inconceivable that fleets of ranging from only a few hundred to over 15,000 trucks must amortize hundreds of millions of dollars from stolen or contaminated fuel rather than suffer the consequences of using a key type locks. But Fleets really do this; and they do this at a huge expense. An expense which can greatly increase shipping costs.

To reiterate, there is a desperate need for a keyless lock that is reliable, inexpensive and protects against all or more of the previously described problems.

Furthermore, attempts to enclose a lock within the fuel filler tube itself have been virtually impossible to produce economically because batteries capable of lasting long enough must be so large that the cap must be huge and it is impossible to fit the device into the filler tube. This makes for a large, clumsy piece of hardware that is expensive, unsightly and unsellable. Furthermore, the size of the cap required would be too big to fit in one's hand. The fear of dead batteries and not being able to remove a cap that is locked if a key is lost, broken, jammed and so forth has thus far prevented battery powered locking caps from entering the market. The present invention overcomes all the above simply because, no matter what happens, the cap will be unlocked and can always be removed.

The present invention is configured as a sealed, keyless locking cap which has no keyway nor does it require any keys to unlock the cap prior to removal. Claim 1 of the present invention depicts a locking cap that is always unlocked after attachment. This is very unique and new to the world of locks. It is common knowledge that locks must be locked when security is required.

The purpose for remaining in the unlocked mode is to insure that the cap can be removed if the batteries fail. This is a new departure from ordinary locking devices which remain in the locked mode as a means of protection. However this is not the only the only area where our device departs from the old fashioned world of locks.

A further embodiment of the present invention utilizes a means which senses when a thief or vandal attempts to remove the cap. This embodiment incorporates a built in smart feature which has a sensing means which immediately locks the cap and prevents removal automatically.

Subsequent to attachment to a filler neck, the circuitry of the present invention keeps the locking mechanism in an unlocked configuration. In this mode, what we call a "fail-safe" no energy configuration, the locking mechanism is deactivated so that the cap can be removed and the batteries can be changed.

The present invention embodies a new concept which can extend the battery life for up to 5 years. This makes the use more appealing and eliminates the worry about battery failure. One of the embodiments that allow this extended life is the lack of any current draw. The lock itself can always be in an "unlocked configuration". The purpose of this may seem senseless however it is one of the most critical claims of the patent. The logic of this statement is that battery operated or electronic locking products can fail. If failure occurs, the cap cannot be unlocked and will be virtually impossible to remove or unscrew. The present invention overcomes this and other problems by using a clever spring coupling means allowing the device to be removed even if the power is inadequate or the batteries fail.

Another embodiment of this invention is a specifically designed circuit consisting of a wireless receiver that is located inside of the lock housing along with the batteries that operates a servo, solenoid or similar device. It may utilize a timer circuit and momentary tactile switches. This embodiment controls a cam, lever, magnetic or other means strategically positioned into the inner housing that will uncouple said coupling means or other means which interface between an inner housing and an outer housing. When the inner housing is not coupled to the outer housing, the outer housing will only frictionally rotate around the inner housing.

A further embodiment of the invention utilizes a transmitter which can be housed in a key chain fob. The transmitter can also be conveniently located inside a vehicle or cigarette lighter plug so that anyone operating the vehicle or machinery or equipment may be able to unlock the device. This feature solves a major problem that large truck fleets have heretofore been held hostage by. The reasons being is that truckers might lose keys, have keys stolen or broken, leave their rig, quit the job, or just plain get sick and cannot proceed. This situation causes a major problem if the fuel cap is locked and cannot be removed for fueling.

In another embodiment, the wireless RF transmitter can be integrated into the ignition switch thereby not being operable without the ignition keys and thereby more secure.

Another embodiment is that the lock housing couples to the "outer shell" and sits above the fuel cap adaptor and attachment means. This assembly is held in place what is referred to as a ring lip that not only keeps the assembly in place but also allows the lower housing to frictionally, rotate slowly. Furthermore, controlled frictional rotation herein refers to a resistive torque to free spinning. This resistive force is provided by utilizing a working relationship between a strategically placed o ring which, in combination with a silicone based grease, allows for a very precise resistive torque further controlling the speed of the caps rotation. Without this critical element, the electronic locking means of the present invention can be defeated simply by quickly rotating the cap or what is commonly referred to as free spinning. Controlled resistive cap rotation allows the cap to rotate at a specified resistive torque which allows a 360 degree rotation lacking in the torque needed to overcome the attachment torque required to remove cap from the container. This is accomplished by the lock housing having coupling means which couples the inner lock housing to an outer housing. In the locked mode, the cap is disengaged from inner housings and can only rotate slowly.

A further embodiment of the invention is to have a strategically located momentary switch or other electronically controlled circuit which activates the lock mechanism. When the locking mechanism is activated, it disconnects the inner housing from the outer housing and puts the invention into the frictionally rotating mode. This can occur every time the outer shell housing is rotated in a complete circle or whenever the switch is activated. In this embodiment, the switch is activated by opposing magnets positioned in the outer wall of the adaptor or attachment means and in the outer wall of the outer housing. When the outer housing is rotated and the magnets pass each other they repel each other and close a micro switch and activate the locking means. The magnets eliminate complicated wiring or the use of a commutator. This saves money and valuable space. In this mode the cap cannot be removed and the momentary switch which may be on for only a few seconds or less draws practically no current. This of course extends battery life which is mandatory to get the extended battery life claim of the invention.

The concept of a cap lock that is not locked until someone tries to remove it is unique to the world of locking devices. This never locked claim supplies the primary reason which will unlock the market to keyless, battery powered locking fuel caps. The fear of not being able to remove the cap will no longer prevail.

This fear of dead batteries and not being able to remove a cap that is locked if a key is lost, broken, jammed and so forth has thus far prevented battery powered locking caps from entering the market. The present invention overcomes all the above simply because, no matter what happens, the cap will be unlocked and can always be removed.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

DETAILED DESCRIPTION OF THE DRAWINGS

FIG. 01 is a perspective view of a battery powered, keyless locking cap 5 comprising of an interchangeable bayonet adaptor for attachment to a bayonet filler neck 6y such that after attachment the cap 5 remains unlocked at all times comprising of an outer cover cap 5 with annular walls encasing a locking mechanism the locking mechanism controlled by an onboard controller 13 that smartly locks the cap 5 during unwanted removal attempts. During wanted removal by an owner or authorized person, a remotely located transmitter 97, as in the interior of a vehicle, and upon activation, transmits a recognized blocking pin code interrupting the locking sequence FIG. 07 thereby allowing wanted removal of the cap 5. Hidden deep within the interior, not visible or accessible from the exterior, a novel, manual, built in, back up pin code entering rotary dialing mechanism FIG. 15 utilizing repelling magnetically controlled micro switches 14a, and 14b, the mechanism not visible and inaccessible from the exterior provides for a unique method to enter a designated pin code. During the unlikely event of a transmitter failure, the owner-user may override the locking system by selective rotation of the cap 5 entering a prescribed pin code recognized by the receiver 13a thereby as above blocking the locking sequence and allowing wanted removal of the cap 5 of FIG. 30.

Figure 2:
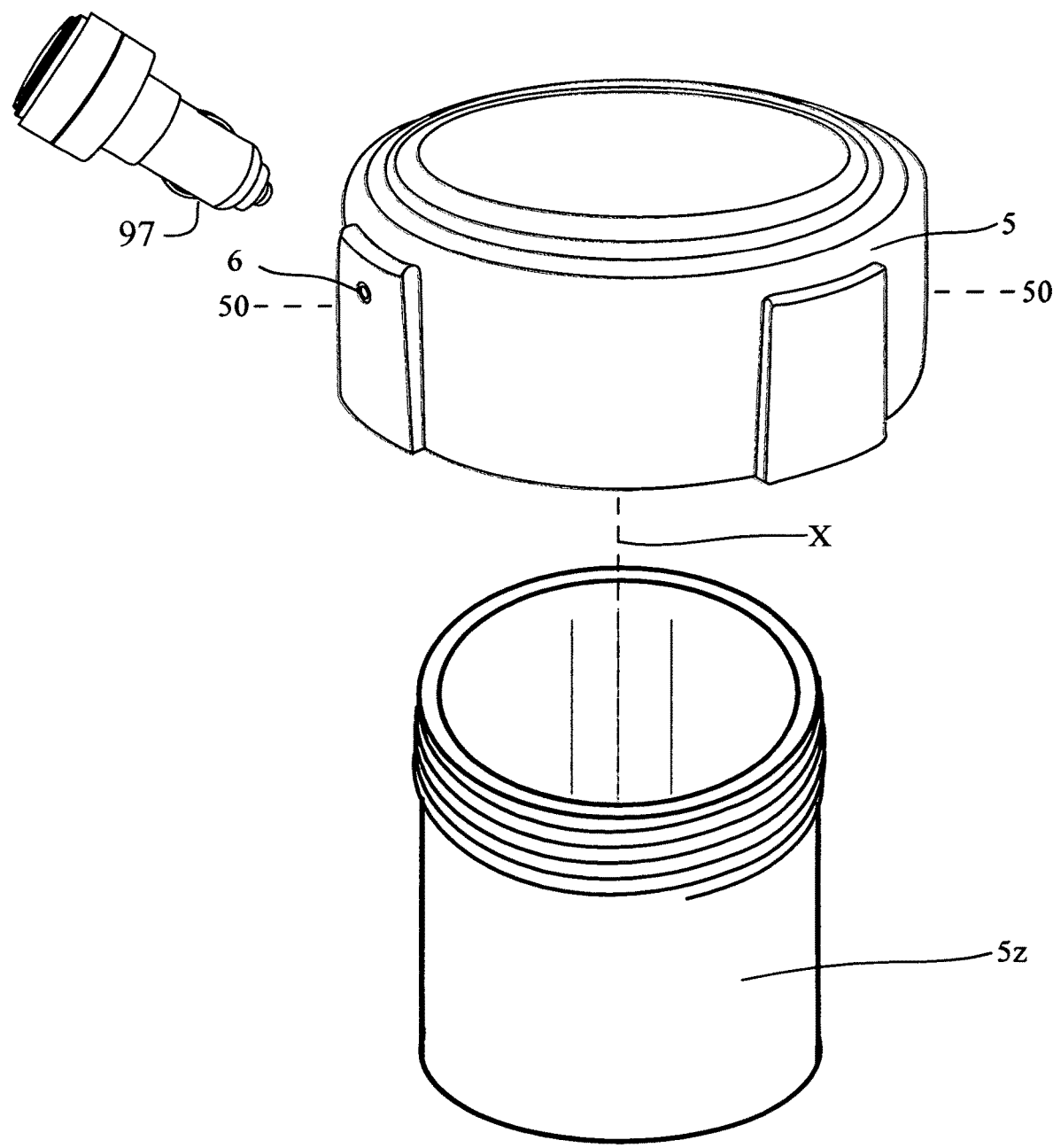
FIG. 02 is a perspective view of locking cap 5 for attachment to a threaded filler neck according to a first embodiment further depicting a perspective view of an RF transmitter configured as a cigarette lighter plug.
Figure 5:
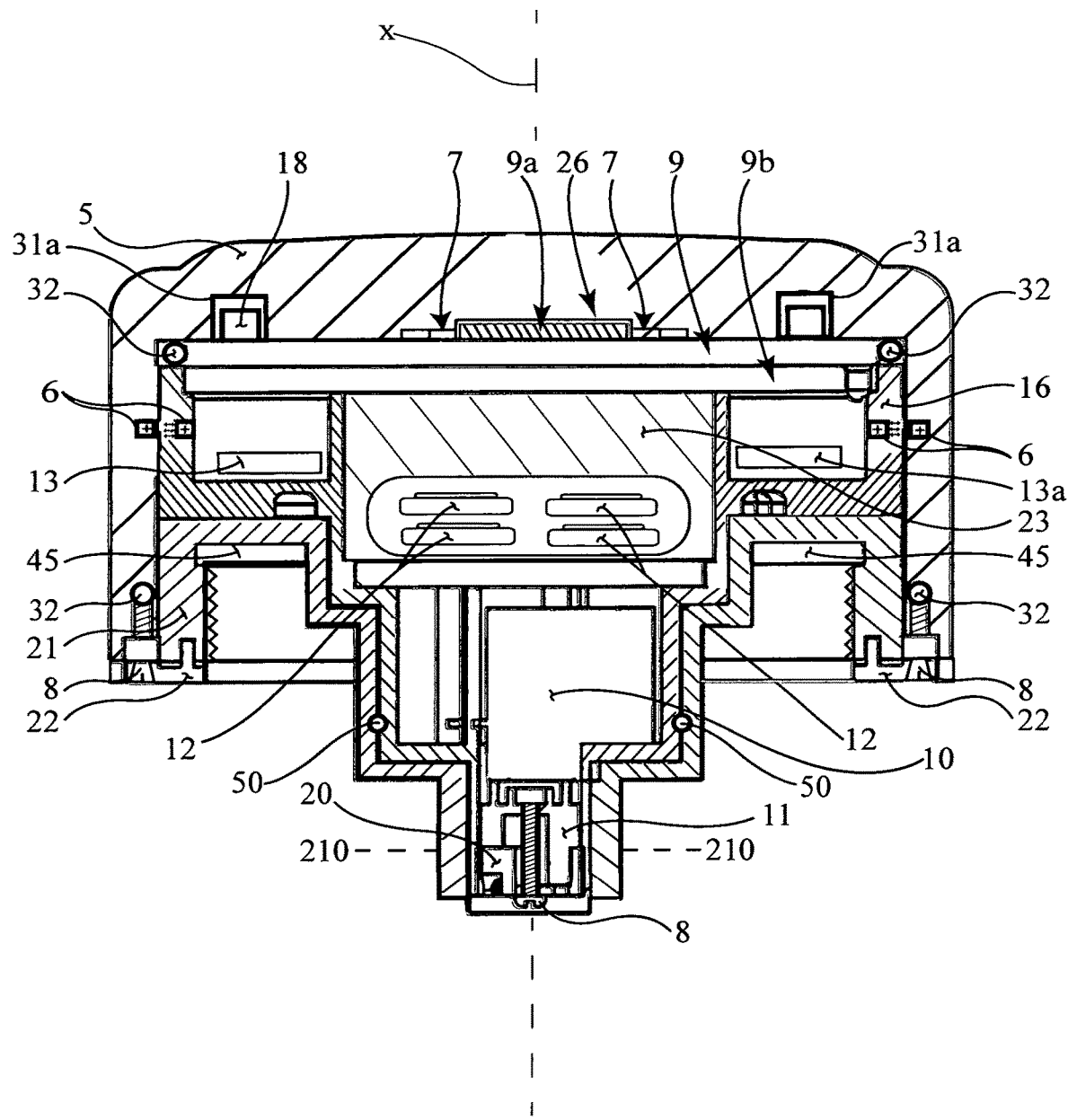
FIG. 05 is a cross sectional views of the locking cap 5 taken along view 50-50 in accordance with the teachings of the invention.
Figure 9:
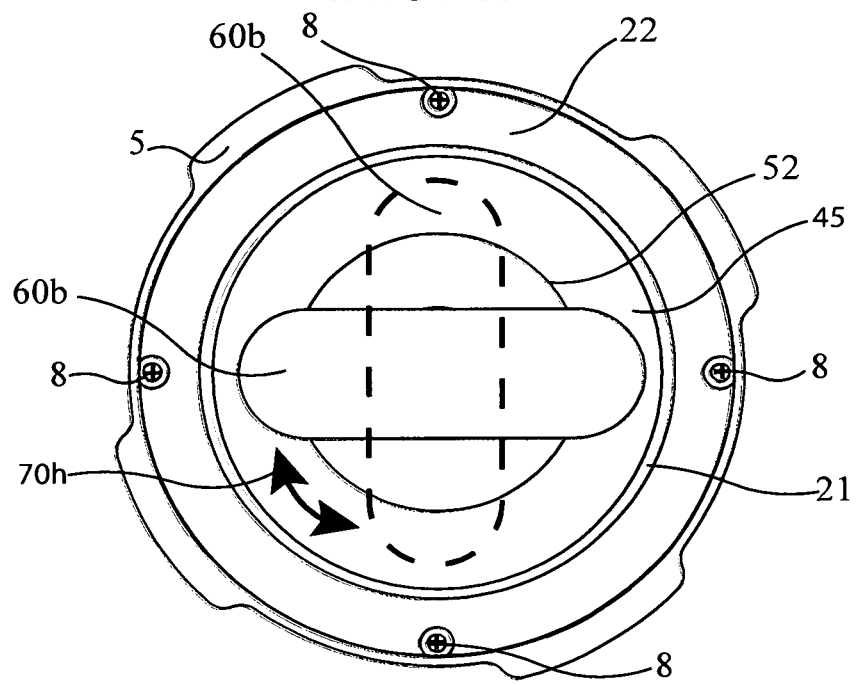
FIG. 09 is a bottom view of the fully assembled cap 5 of the invention held in place by the ring lip seal depicting the rotary bayonet latching arm 60b.
Figure 10:
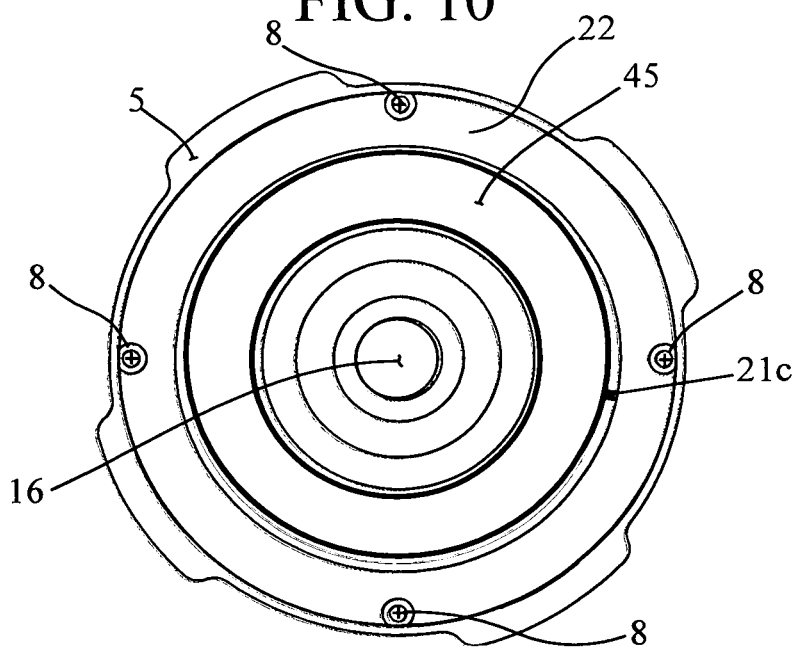
FIG. 10 is a bottom view of the fully assembled cap 5 of the invention held in place by the ring lip seal of the threaded attachment means.
Figure 21:
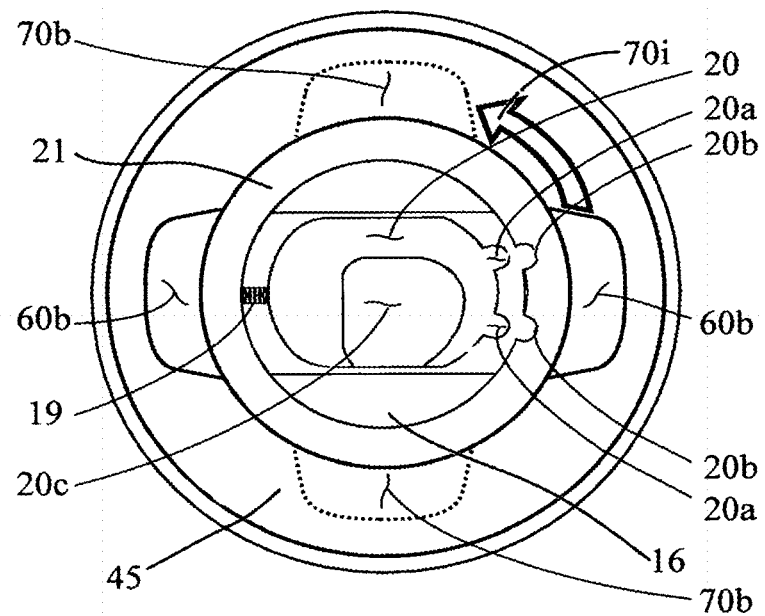
FIG. 21 depicts the locked state of the invention where the spring loaded coupler compression spring is compressed and disengaged from 2 female grooves of embodiments of the invention.

FIG. 02 is a perspective view of a locking cap comprising the locking means of FIG. 21 but utilizing an optional, but clever attachment adaptor 21 of FIGS. 05, 09, and 10 that is interchangeable with the bayonet attachment adaptor of FIGS. 25 and 26 thereby uniquely providing only one basic model with a mounting means that covers the major percentage of the market worldwide thereby saving excessive inventory, storage space, time and money.

Figure 3:
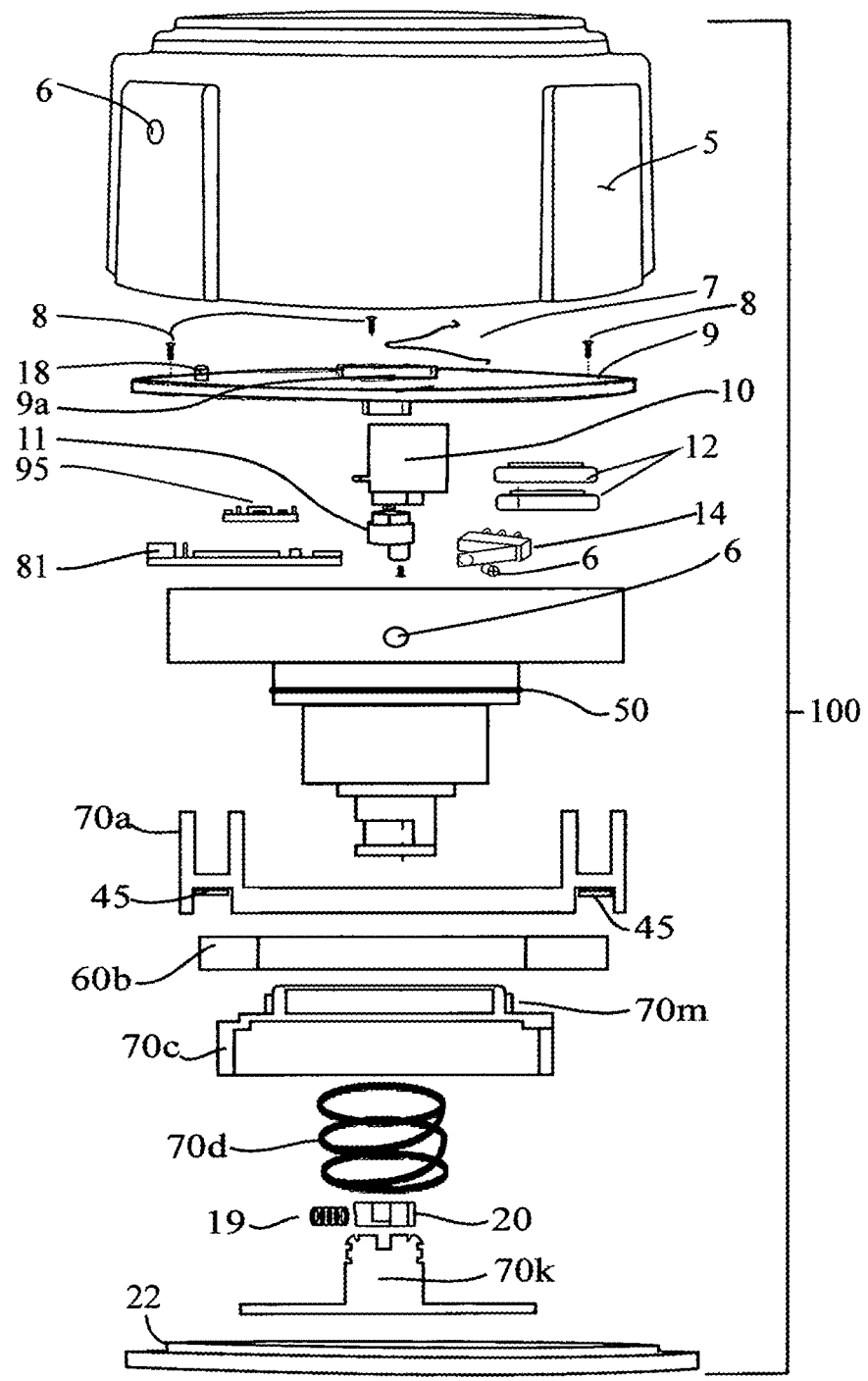
FIG. 03 is an exploded view of the locking cap 5 constructed in accordance with the teachings of the present disclosure comprising of a bayonet type attachment means FIG. 27 to a bayonet filler neck.

FIG. 03 is an exploded view bracket 100 of the locking cap 5 constructed in accordance with the teachings of the present disclosure comprising of a bayonet type 70a of FIGS. 25 and 26 providing an attachment means to a bayonet filler neck 5x of FIG. 01.

Figure 4:
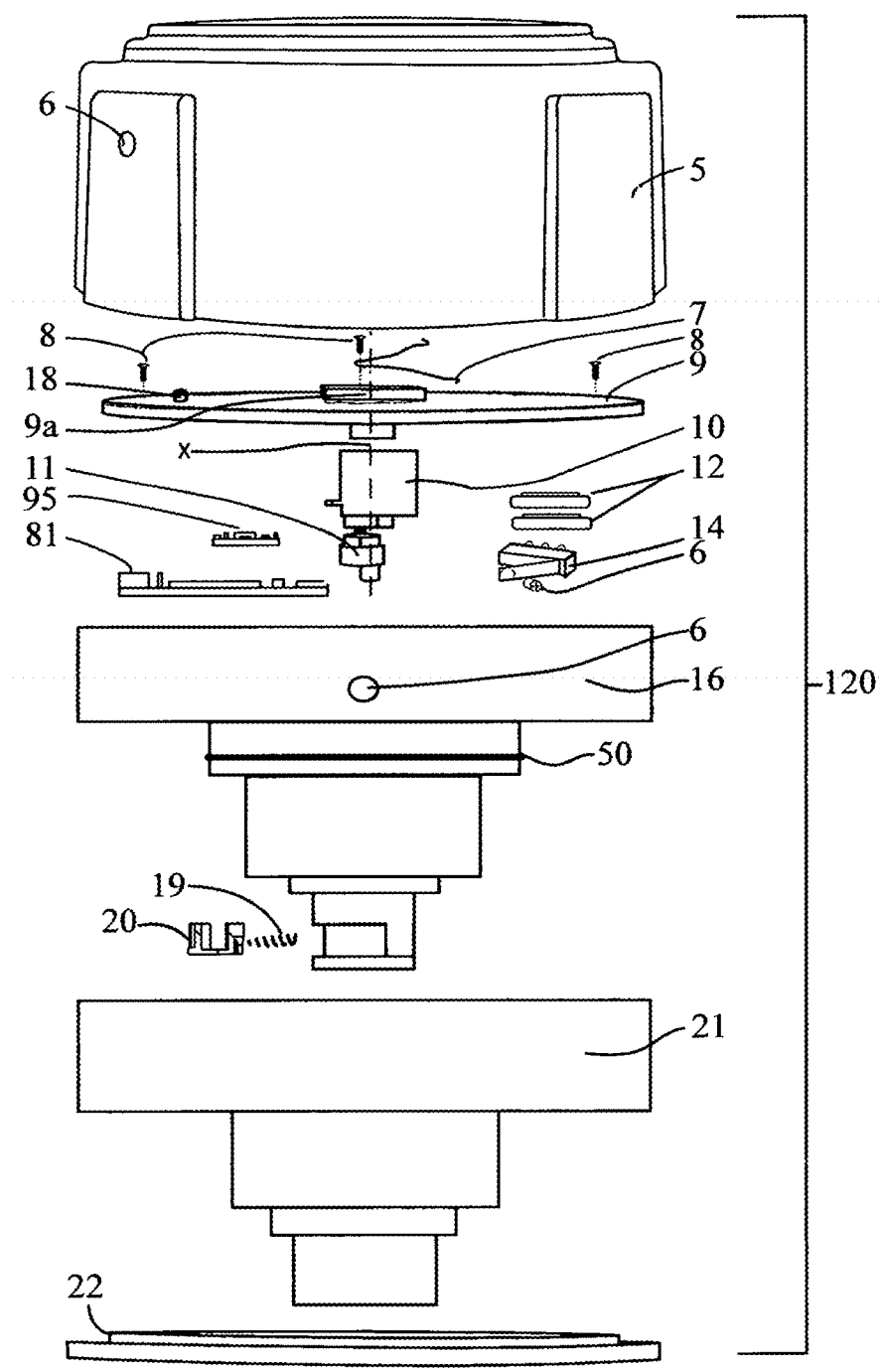
FIG. 04 is an exploded view of the locking cap 5 constructed in accordance with the teachings of the present disclosure comprising of a threaded type attachment means FIG. 29 to a threaded filler neck.
Figure 18:
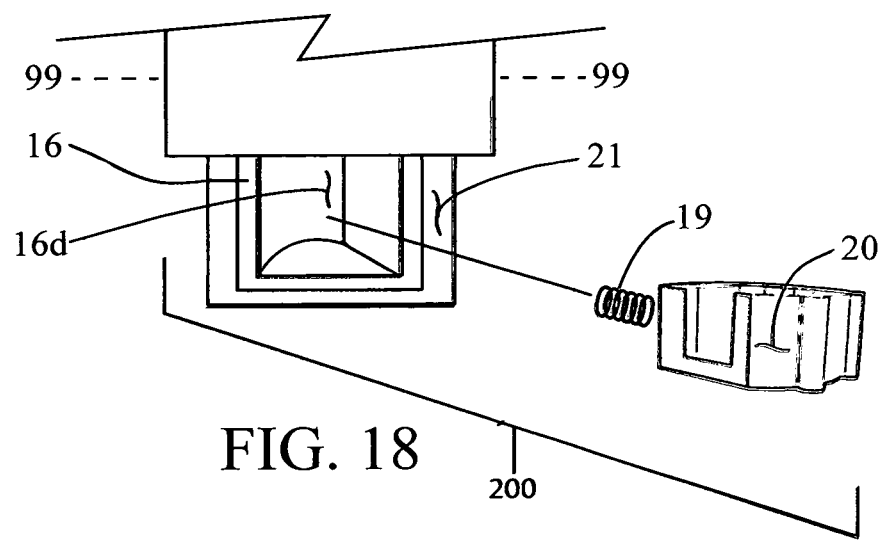
FIG. 18 is a cutaway view of lock housing 16 taken along line 99 whereby the lower section of housings 16 and 21 are assembled revealing the placement area for the spring loaded coupler.
Figure 20:
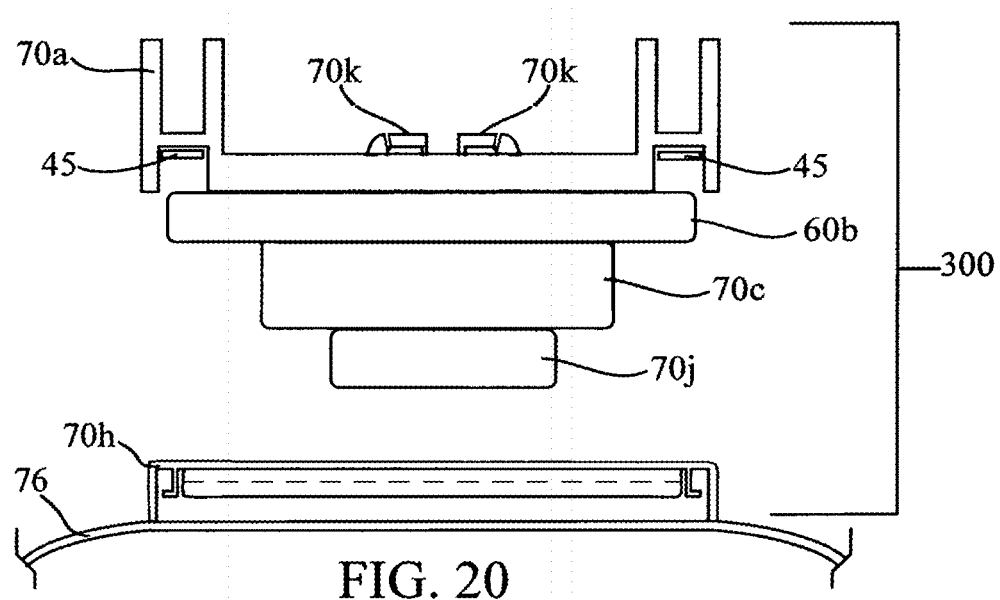
FIG. 20 depicts a side view of an interchangeable bayonet attachment adaptor hovering above a cutaway view of a bayonet filler neck.

FIG. 04 is an exploded view bracket 120 of the locking cap constructed in accordance with the teachings of the present disclosure comprising of a threaded type adaptor 21 of FIGS. 18 and 20 providing an attachment means to a threaded filler neck 5z of FIG. 02.

FIG. 05 is a cross sectional view of the locking cap 5 in accordance with the teachings of the invention of FIG. 02 taken along mid line 50-50 of FIG. 02 comprising of: the outer cap 5, semicircular slot 31a controlling the rotation of the cap 5 by containing the rotation of dowel pin 18, the rubber seal 45, repelling magnets 6, a recessed circular opening 26 for spring 7 clearance locating raised semicircle 9a of the interior lock housing 16 a clever universal threaded adaptor FIG. 21 which can be interchanged with a universal bayonet type fill neck adaptor 70a thereby allowing attachment to a container's bayonet receiver FIG. 01 or threaded filler neck FIG. 02. The raised area 9a serves to locate the interior housing 16. The spline adaptor 11, comprising universal fitment adaptor 11b utilizes different openings that mate with different servos or motorized rotary devices, the batteries 12, the spring loaded coupler 20, the controller 13, the rotary servo 10 comprise the visible electronics. A foam filler 23 the o rings 32, the bottom ring lip retainer 22; O ring seal 32, frictional O ring 50 providing a frictional force of 8.9 pounds, mounting screws 8 and axis x complete the description.

Figure 6:
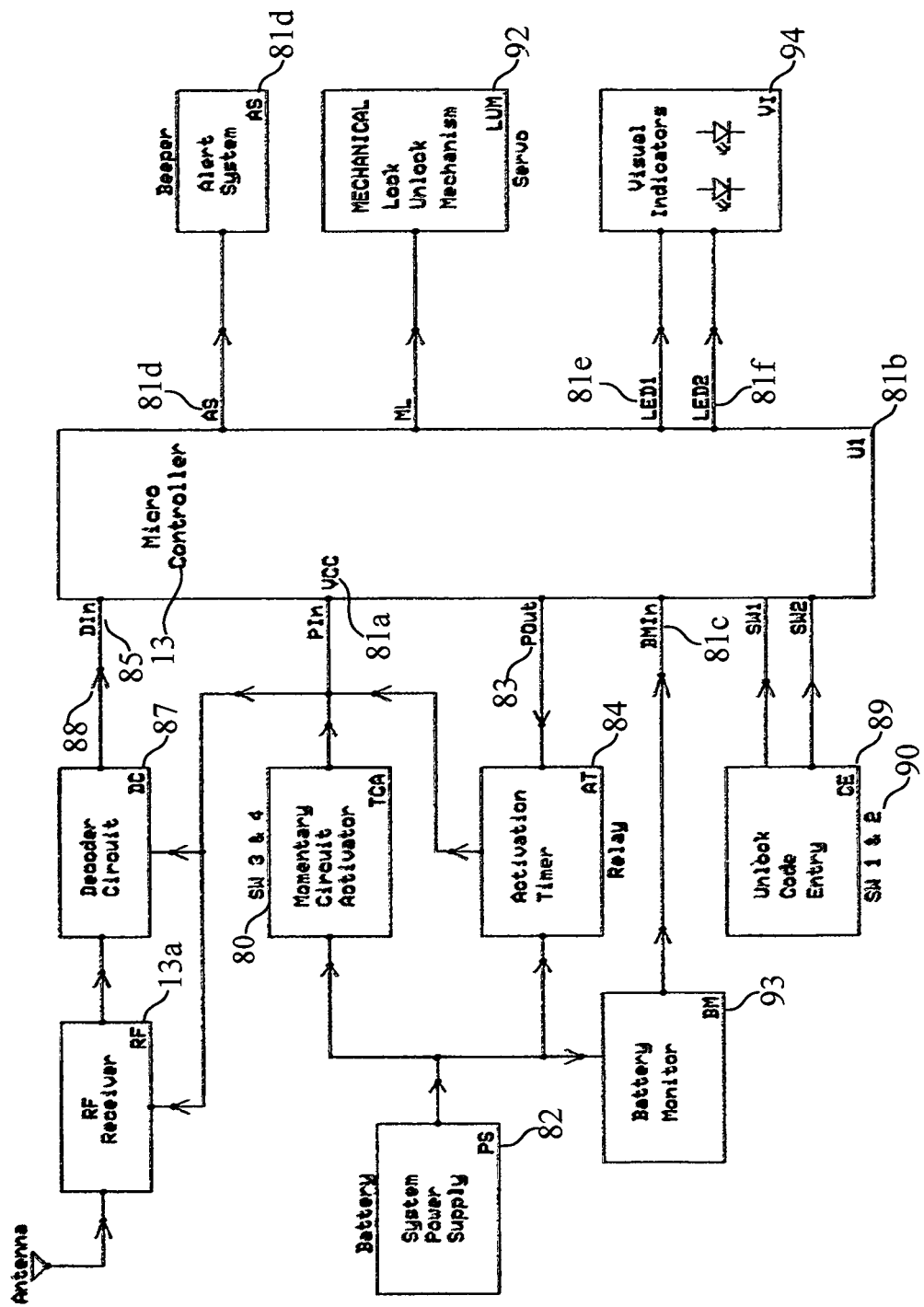
FIG. 06 is a diagram of the controller circuitry and receiving circuit.

FIG. 06 is a block diagram of the electronic pin code circuitry consisting of all functions described in the Theory of Operation below:

Theory of operation cap lock/unlock electrical mechanism:

Refer to FIG. 06

All electrical components are off the shelf.

When either of the "Momentary Circuit Activator" switches 80 SW3 or SW4 is manually closed by the "user", power is momentarily supplied to the microcontroller 13 at VCC (Pin) 81a from the System Power Supply (PS) 82.

The microcontroller program then outputs a signal at Pout 83 to the "Activation Timer" (Relay (AT)) 84 bypassing both manual switches SW3 and SW4 80 and applying power 82 to the microcontroller 13 continuously.

The system program can now continue since it has a steady supply of power from the battery (PS), 82.

The micro controller program then looks at the input signal at DIN 85 of the microcontroller.

If the remote transmitter 97 (FIG. 06) is "ON', then the "RF Receiver" (RF) 13a outputs an encoded signal to the "Decoder circuit" (DC) 87.

The decoded signal from the "Decoder circuit" (DC) 87 is then applied to Din 88 on the Microcontroller 13.

If the microcontroller action (U1) 81b sees a valid decoded signal at Din 88, then the program continues.

The microcontroller then looks for an UNLOCK CODE from the "unlock code entry" (CE) 89 entered manually by the "user" via the input pins to the microcontroller at SW1 and SW2 (90).

If the microcontroller 13 sees both a "VALID" signal at Din 88 and a correct "unlock" code at inputs SW1 and SW2 (90), the program continues and outputs a signal (ML) 91 to the Mechanical Lock/Unlock Mechanism (LUM) 92.

The system is now unlocked so the user can remove the cap 5 from the filler neck on the storage containers.

If both the above conditions are NOT met then the microcontroller (U1) 81b does NOT unlock the device.

The state of the battery (its charge) is monitored when the microcontroller 13 is active via the battery Monitor circuit (BM) 93 via input pin to the microcontroller BMIn 81c.

If the battery is weak, the microcontroller 13 can output a signal to either the "AS" 81d output line of the microcontroller 13 which activates the "ALERT SYSTEM" (AS) 81d, a beeper or it can output a signal on either of the microcontroller outputs LED1 (81e) or LED2 (81f) lighting one or both of the "visual indicators" (V1) 94.

A third option for a weak battery is to prevent the system from locking the mechanism.

Figure 7:
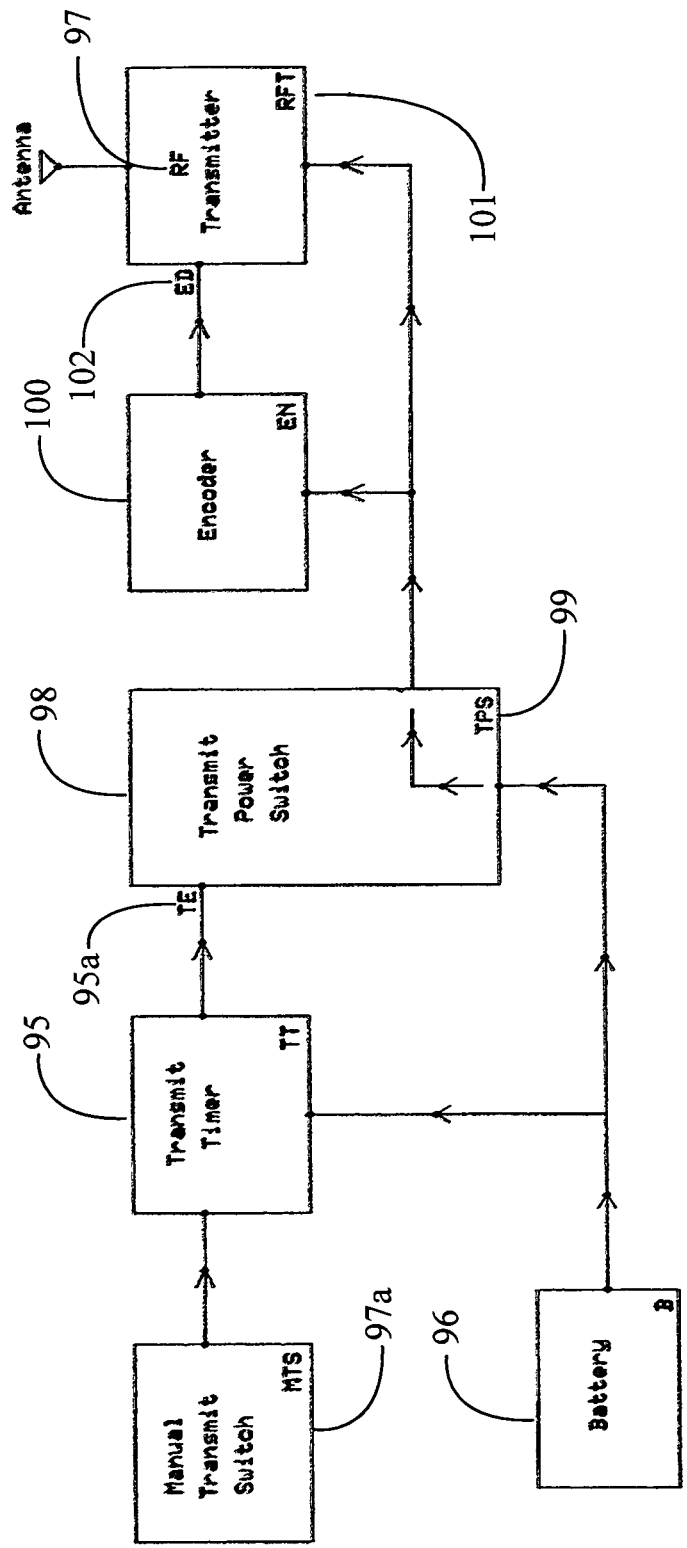

FIG. 07 is a block diagram of the electronic transmitting circuitry as described below:

Theory of Operation Transmitter Circuit:

Refer to FIG. 07:

Power is applied to the Transmit Timer (TT) 95 at all times by Battery (B1) 96. Upon pressing the Manual Transmit Switch (MTS) 97a the transmit timer is activated. The Transmit timer (TT) 95 determines the length of time the system will transmit a fixed code.

When Transmit Timer (TT) 95 is activated it applies an output signal TE 95a to the Transmit Power Switch (TPS) 99.

When the Transmit Power Switch TPS 99 is turned "ON", power is applied to both the Encoder circuit EN 100 and the RF Transmitter 97.

The encoded OUTPUT signal ED 102 from the encoder is transmitted via an RF 97 Transmitter circuit RFT 101.

This signal is received by the main unit some distance away. If the processor in the receiver unit sees a valid signal from the transmitter 97. The processor will then allow the program in the Microcontroller 13 to RUN.

If a Valid code is not recognized by the Microprocessor in the main unit then the program is halted as a valid code is NOT recognized and the microcontroller 13 will lock the cap if rotated.

Figure 8:
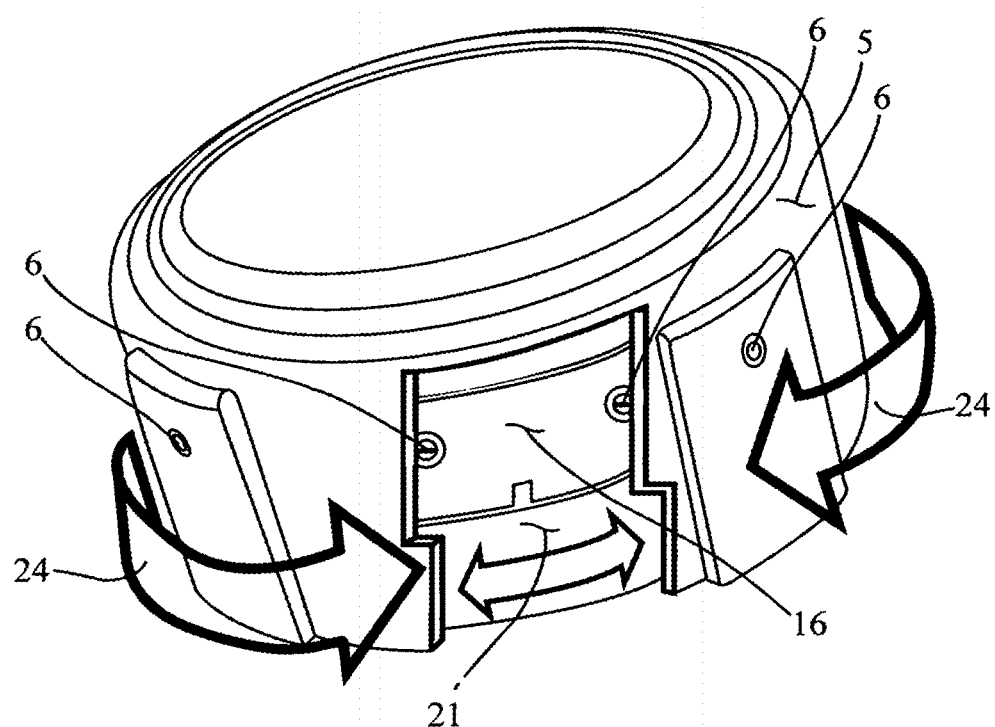
FIG. 08 depicts the outer cap 5 that can frictionally rotate about the interior housings to enter the unlocking pin code according to the embodiments of the invention.

FIG. 08 is select cutaway illustration of the complete assembly shown rotating the outer housing 5 around a mounting adaptor 21 with the magnets 6 positioned in the outer housing correspondingly located in the upper lock housing 16 along with arrows 24 detailing frictional rotation of the outer shell clockwise or counter clock wise FIG. 09 is a bottom view of the bayonet attachment assembly means of the cap of FIG. 01. The outer cap 5 comprising all bayonet components of FIG. 14 and detailing the bayonet entrance position and the attachment arm 60b (dotted) position after arrow 70i of FIG. 23 rotational attachment to a bayonet filler neck 5x, bottom ring lip retainer 22 of FIG. 28 secured by mounting screws 8. Rotational arm 70b moveable downward during rotation by ramp 70f compressing spring 70d then spring 70d extending again thereby tightly sealing rubber gasket 45 against filler neck 5x of FIG. 01.

FIG. 10 is a bottom view of the threaded attachment assembly means of the cap of FIG. 02. The outer cap 5 comprising all the threaded adaptor components (not visible here) sealing with rubber gasket 45 and by rotary attachment to a threaded filler neck 5z, bottom ring lip 22 utilizing mounting screws 8 secures the assembly.

Figure 12:
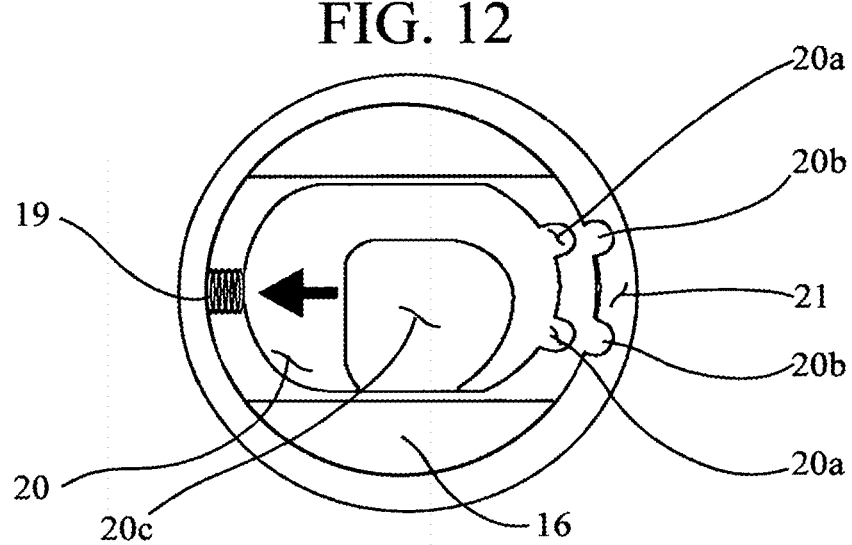
FIG. 12 details the spring loaded coupler compressed in the disengaged locked position.
Figure 13:
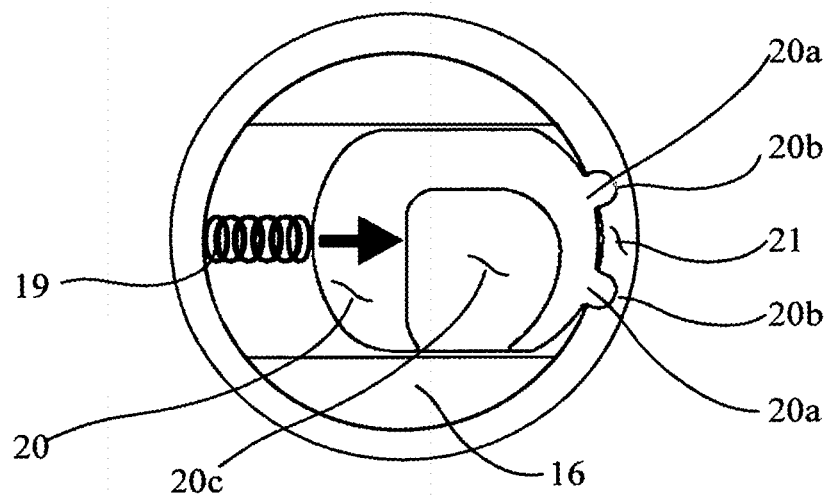
FIG. 13 describes the spring loaded coupler in the constant, independently forced, unlocked position.
Figure 22:
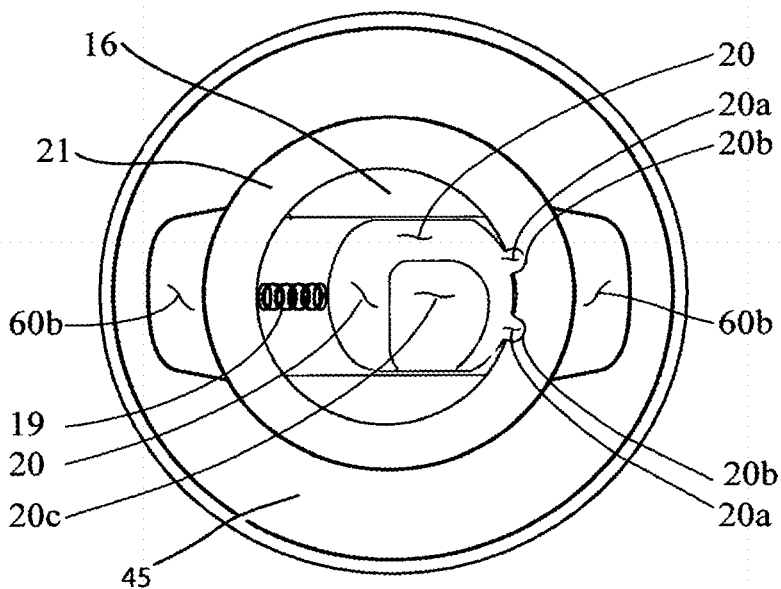
FIG. 22 depicts a bottom view of the spring loaded coupler independently applying force thereby coupling the inner and outer housings thereby allowing removal or re-attachment of the outer cap 5.

FIG. 11 is an enlarged view bracket 140 of a motorized coupling device 10 comprising of an independently operated constant pressure, spring loaded coupler 20 moveable by compression spring 19 and slotted for lateral movement 20e such that a self-actuating compression spring 19, lacking any external activator or any battery energy, forces 2 male protrusions 20a into engagement with two corresponding recessed female slots 20b inscribed into the inner diameter of housing 21 of FIGS. 12, 13 and 22 when all power is off thereby providing sufficient torque for removal. Accordingly, movement of the outer housing 5 is in concert by rotation simultaneously rotating with the inner housings 16 and 21 thereby allowing the removal of the security cap from a filler neck in accordance with the embodiments of the invention.

FIG. 11a also depicts is a bottom view bracket 150 of the slotted coupler 20 and how spring 19 attaches to the slotted coupler 20.

FIGS. 12 and 21 depict the cap configured in the disengaged (locked) position according to the embodiments of the invention herein.

FIGS. 13 and 22 depict the invention in the engaged (unlocked) position according to the embodiments of the invention herein.

Figure 24:
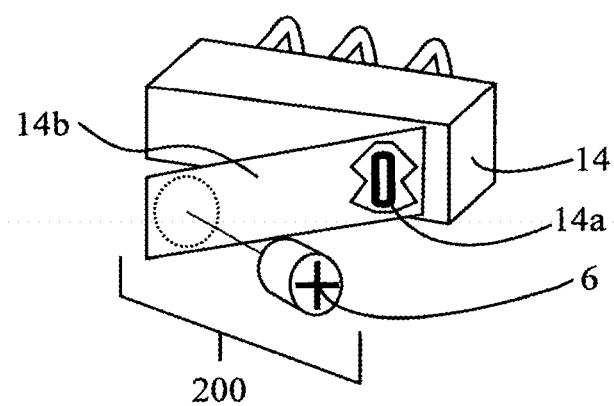
FIG. 24 is an isometric drawing of a magnetically capped switch that is used to activate electronic functions of FIGS. 6 and 7.
Figure 27:
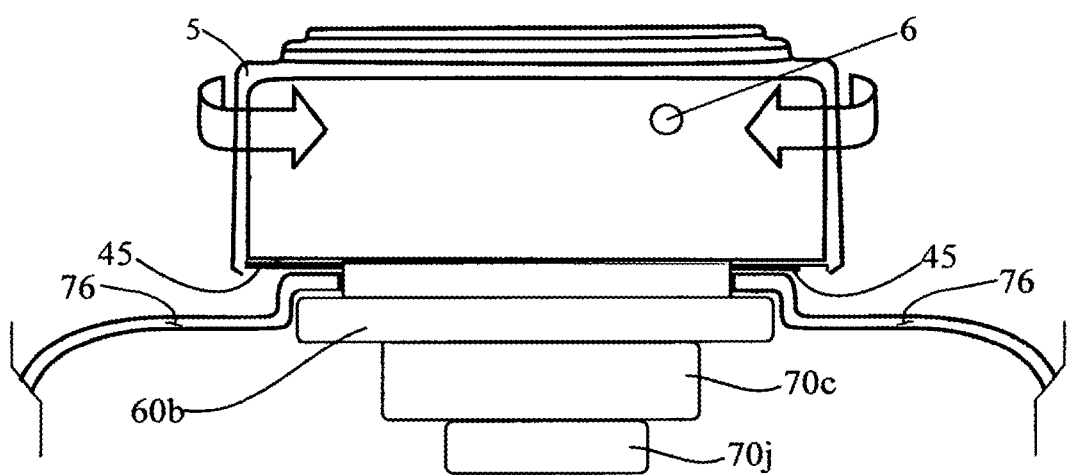
FIG. 27 depicts the invention attached to a bayonet filler neck.

The cap 5 is operatively connected to the lid 9 of the lock housing 16 by a dowel pin 18 of FIG. 05 or other suitable means that travels within a defined groove 31a, of FIG. 05 located in the underside of the cap 5. When rotated past each other (SEE FIG. 08), like charged magnets 6 close and activate select magnetic capped switches 14 of FIG. 24 which trigger the controller 13 to rotate a servo 10, thereby rotating the offset spline 11 which in turn moves the coupling device 20 to a position that compresses the independent, constant tension spring 19 thereby disengaging the spring loaded coupler 20 (See FIGS. 12, 17, and 21). Accordingly, movement of the cap 5 is not in concert by rotation with the inner housings 21 of FIG. 08 or 70a and will only frictionally rotate around the inner housings (See FIGS. 08, 16, 21) and 70a of FIGS. 25 and 26 such that the cap 5, comprising insufficient torque cannot be removed. The means to lock and unlock the invention will become clearer as we progress below.

Referring to FIGS. 05 and 08, the security device is shown in more detail. The internal structure of the cap 5 outer housing may be a generally annular structural configuration. A slot on the underside 31a of cap 5 of FIG. 16 provides for a dowel pin 18 suitably positioned on the lid 9 of lock housing 16 of FIG. 17 bracket 150 controlling the degrees of rotation thereby controlling maximum rotation of the cap 5 relative to lock housing 16. Recessed area 9a of FIG. 16 provides circular clearance for a default return spring 7 and raised semi-circle 9a on the lid 9 of the inner lock housing 16 guiding rotation about axis x. The outer housing 5, comprising magnets 6, strategically positioned to line up with like charged magnet capped micro switches 14a, 14b, 14c, and 14d of FIG. 24 positioned in the lock housing 16 of FIG. 15 such that when the outer housing 5 is rotated counter clockwise, or clockwise (See FIG. 08), the opposing force fields of the magnets 6 activate micro switch 14c or 14d of FIG. 15 thereby activating controller 13 initializing the locking sequence whereby servo 10 rotates attached offset spline adaptor 11 compressing spring 19 of FIGS. 12 and 21 enabling the disengaged, locked position thereby cap 5 will only frictionally rotate about the inner housings 16, 21 and 70a. It is notable here that magnetic capped switches of are of the lever type so as not to have to use too much magnetic force to depress the plunger button 14a (See FIG. 24), bracket 200.

Figure 16:
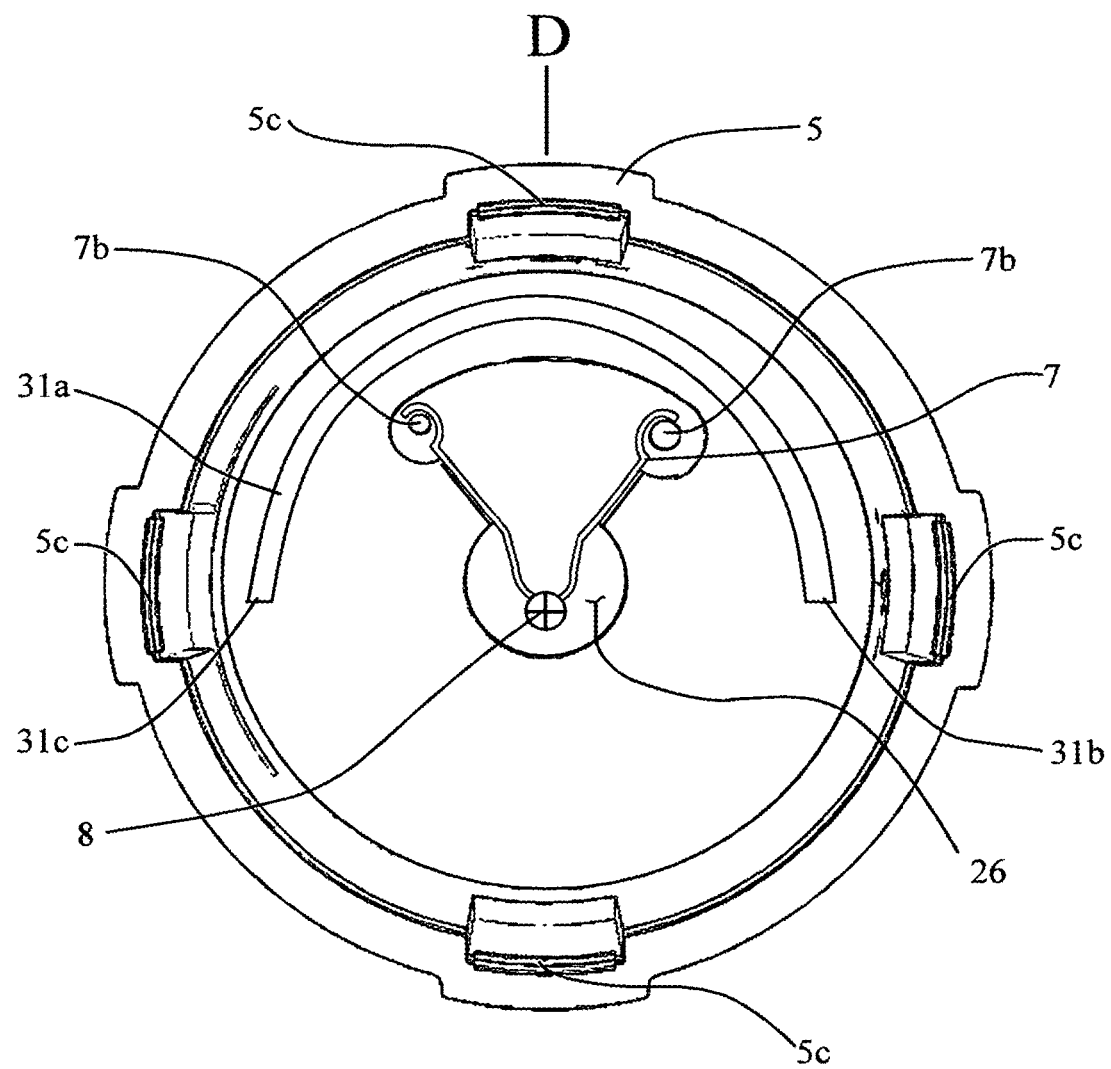
FIG. 16 is a view of the underside of cap 5 revealing semicircular slot 31a with end points 31b and 31c that control cap rotation relative to the inner housing 16 whereby spring 7 returns the outer cap 5 to a default position.
Figure 17:
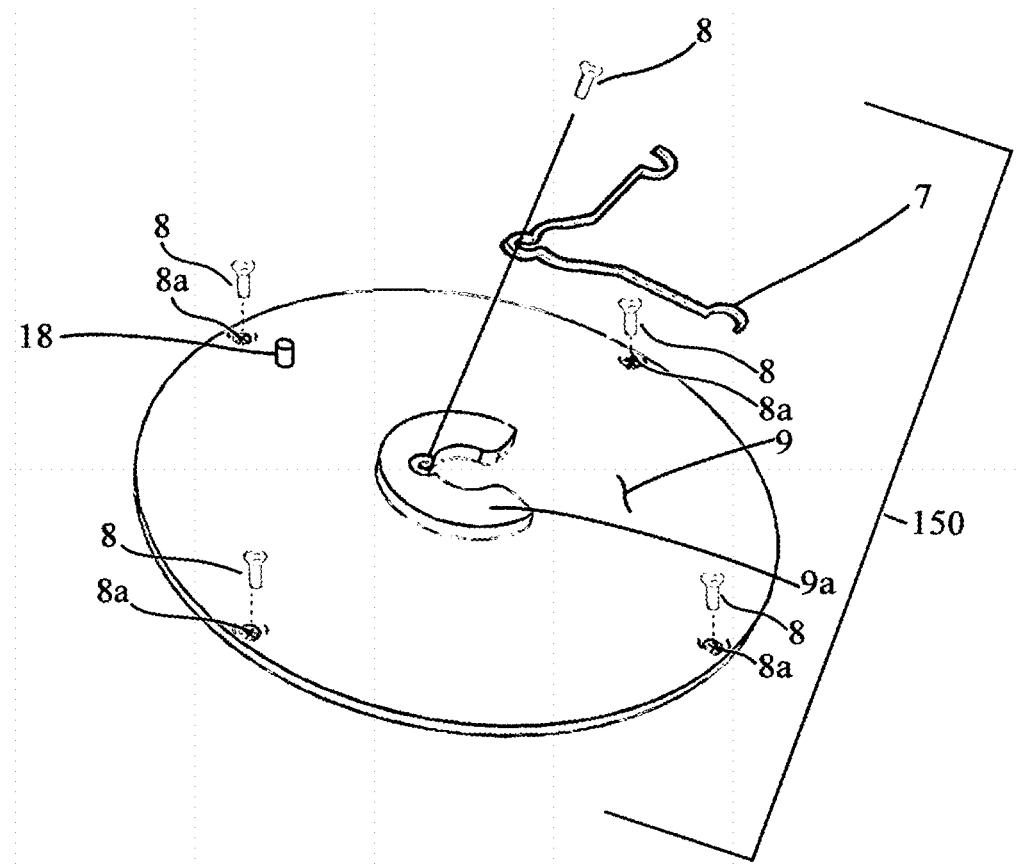
FIG. 17 is the lid of the lock housing 16 showing the dowel pin 18 and return spring 7 and the raised semicircle 9a that locates the lid and dowel pin inside the recessed area 26 of the underside of the cap that returns the cap to its default position.
Figure 30:
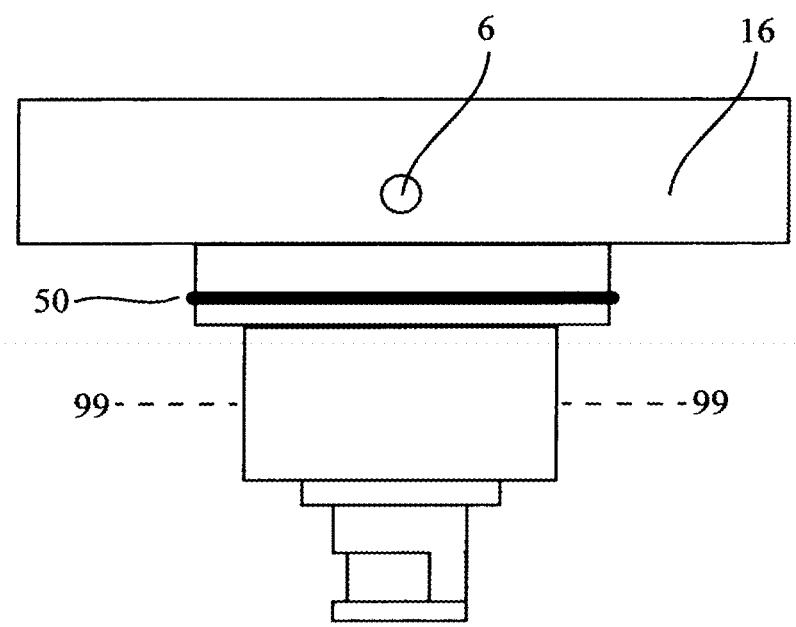
FIG. 30 is a side view of the upper lock housing 16 depicting magnet 6 and O ring 50 that is used to provide frictional slippage a new concept to allow controlled rotation resistance when locked but not free spinning rotation.

Upon locking, and during cap rotation when dowel pin 18 of FIG. 17 of bracket 150 reaches the end points of slot 31a, a semicircular slot 31a with endpoints 31b and 31c of FIG. 16 in the underside of the cap 5 stops cap rotation at precise switch locations 31b or 31c of FIG. 16 cap removal is interrupted by the unique function of O ring 50 of FIG. 30 by creating a frictional resistive force of 9 pounds thereby controlling rotational speed of cap 5. While locked and disengaged, outer cap 5 will only frictionally rotate; not free spin about threaded attachment adaptor 21 of FIG. 05 or about the interchangeable bayonet attachment adaptor 70a of FIG. 25. A torque of 40 plus pounds is required to remove and detach cap 5 from filler neck 5x or 5z. The specifically designed resistive frictional force of only 9 pounds during cap 5 rotation is insufficient to overcome the 40 pounds of torque required to detach cap 5 from a filler neck thereby entering to a mode henceforth referred to as frictional slippage; a clever nuance to the world of locking caps.

Frictional slippage is at the heart of the invention. Simply put it has been deliberately engineered to slip. It is the mechanism that allows the outer cap 5 to rotate slowly, not spin fast enough to beat the time the controller 13 needs 1 second to lock the cap against break in. Therefore the concept of frictional slippage is hereby intended to be protected from use by any use in the field of this invention that will enable frictional slippage.

A dual operating spring loaded coupler 20, comprising of a stored up energy spring retainer slot 19c and a constant tension compression spring 19, having a female area 20b that receives two vertical male posts 20a, which correspond to female slots 21a in the circular inner surface of mounting adaptor housings 21 or 70a facilitates operative coupling of lock housing 16 and threaded adaptor 21 (See FIGS. 13, 21, and 22). The independently operated spring loaded coupler 20 is moveably engaged by the stored up energy of spring 19 when all power is off.

Figure 19:
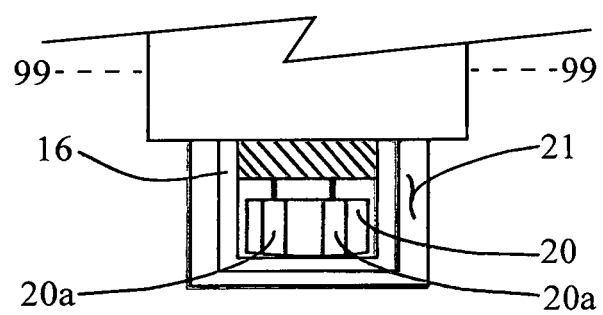
FIG. 19 is a cutaway view of lock housing 16 taken along line 99 whereby the lower section of housings 16 and 21 are assembled revealing the coupler of FIG. 18 in place.

FIG. 19 further depicts the spring loaded coupler 20 after insertion into housing 16. Posts 20a are mated into engagement by spring 19 but at only one area in the circumference of the adjacent housing 21. The spring loaded coupler 20 is never engaged by the on board controller 13. The spring loaded coupler can only be disengaged by the motorized coupler 10. The motorized coupler (servo or the like) rotates and over powers spring 19 of FIGS. 11 and 11a.

FIG. 20 depicts spring loaded coupler 20 the lower section of inner housing 16 of FIGS. 18 and 19 where the spring loaded coupler is fitted into 16d; 21 is the adjacent inner housing with corresponding female slots 20b of FIGS. 12 and 13 such that spring 19 forces the male post into engagement. Bracket 200 of FIG. 18 along lines 99-99 depict the area 16d of the lower part of lock housing 16 configured in adaptor 21 that houses the spring loaded independently coupling means when all power is off. (Also see FIGS. 21 and 22). Controller 13 is activated by a series of strategically positioned magnet capped switches 14 of FIG. 24. The magnet capped switches are only activated by opposing magnets 6 of like charge suitably positioned in the outer housing 5 (See FIG. 08). When the outer housing 5 is rotated as in FIG. 08, the magnetic switches 14c or 14d of FIG. 15 line up with like charged magnets 6 located in the inner circumference of cap 5 of FIG. 05 and the repelling force created by the opposing like charges close the switches 14. In response, the controller 13 can initiate the locking sequence or turn off the power entirely.

The cap 5 has been designed to always be in an unlocked state during attachment to the neck filler. However, anytime the cap 5 is slightly rotated magnetically operated switches 14 of FIG. 05 will be activated by the opposing forces of magnets 6 of FIGS. 05 and 08 while passing each other activating controller 13 to lock the cap 5. The inner, lock housing 16 of FIG. 15 comprises the electrical circuitry programmed to receive or manually perform the locking and unlocking sequences . . . the power source (i.e. batteries) 12, a servo 10, solenoid or other motorized device, logic controller 13, magnetically operated switches 14. Circuit block diagram of FIG. 06 discloses an explanation of the workings of the controller 13. Another block diagram detailing the transmitter operation FIG. 07 is included.

The remote transmitter 97 when activated transmits a signal to the receiver 13a which in turn signals the controller 13 not to lock. Cap 5 thereby and without using a key, cell fob or code entering means cap 5 may be instantly be removed by a wanted user. In the event of a transmitter failure, lost Key Fob, a backup four digit, pin coded rotary encoded back up system designed specifically to permit uninterrupted removal of the cap 5, can be manually entered into the controller. Below is the very unique method teaching how to manually enter the four digit pin code number 4332: (See FIG. 23).

Figure 23:
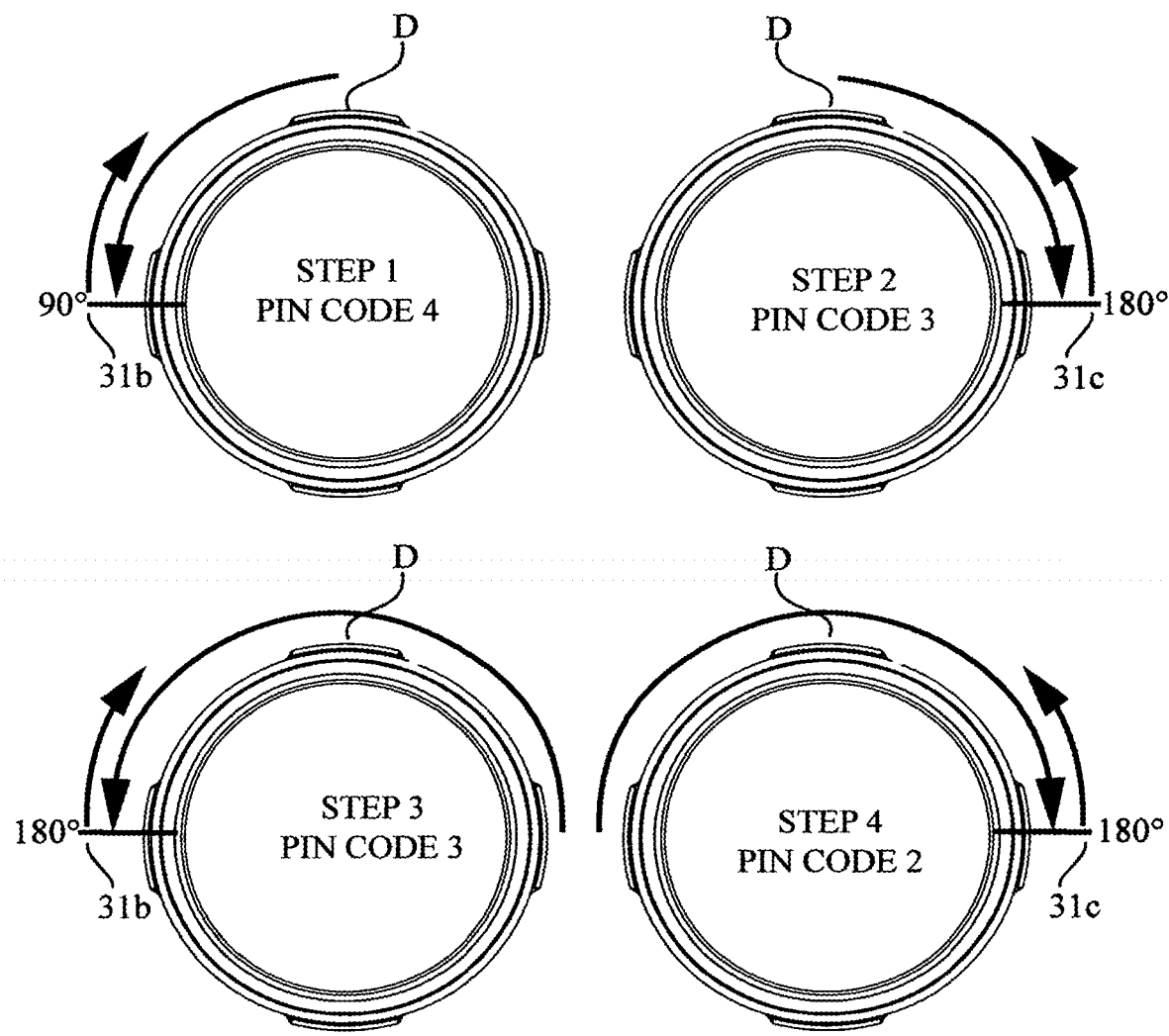
FIG. 23 describes how a pin code of the invention is entered by simple rotation of the outer cap 5.

FIG. 23. is a diagram detailing the 4 steps of entering the numerical 4 digit pin code: for example: 4332.

Step 1: Rotate of the cap 5 counterclockwise 90 degrees to slot end position 31b of FIG. 16 Beeper 81d will emit an audible beep. Another way to count the pin code entry's is to simply count the number of times you feel it hit the slot's endpoints or hear the beeps; you will easily feel the endpoint or hear the beep that makes pin code 1. You will also be able to easily hear the sound of metal hitting the metal endpoint.

Next, slightly rotate the cap quarter turn right (no farther) then back again to the left endpoint that's beep 2 now repeat the same 2 more times (4 beeps total) that makes pin code 4.

Step 2: Rotate the cap counterclockwise 180 degrees all the way to the right to slot endpoint position 31c then back one quarter turn and repeat the same procedure; 3 beeps to the right to make 3.

Step 3: Rotate counterclockwise again all the way to endpoint 31b; 3 beeps to make 3.

Step 4: Rotate clockwise again to the endpoint to make 2.

Pin code 4332 is now entered. Next, let the default spring 7 return the cap left to the default position D and wait 10 seconds and then remove the cap.

The controller program also comprises a unique program that will only allow entering a particular number of attempts to enter the code. Thereafter failure to enter the correct pin code will shut down the system for a prescribed time period before allowing further attempts to enter the pin code. For example, and not limited thereby, after 5 attempts the unit will be shut down for 10 minutes thereby significantly limiting the number of attempts by an unwanted user and discouraging unwanted attempts to remove the cap.

The cap 5 extends to cover the lower inner housings 16 and 21 and comprises a recess area 26 of FIG. 16. A lip retainer ring 22 of FIG. 28 keeps the assembly in place (See FIGS. 09 and 10). The splash-guard/ring lip 22 although stopping grime and dirt, eliminates the need for an O ring seal. But the main purpose for the ring lip 22 is to seal the clearance between the inner housing 16 and 21 and outer housing 5. This clearance is arbitrary and can be whatever is required to provide an air barrier, (See FIG. 09). For outdoor applications such as outdoor fuel storage tanks or transport trucks, an air barrier gap serves to prevent heat transfer between the inner housings 16 and 21 and the outer housing 5 so that extreme temperatures on the outer housing 5 do not transfer to the inner housing 16 and 21. The upper lock housing 16 can be constructed from a heat resistant plastic such as Acetyl which can withstand extreme temperatures. It is also to act as an insulator against heat to help protect battery life. Moreover, there can be an insulating layer between the lid 9 and the outer housing cap 5 that can be used to prevent heat transfer from the outer housing 5 to the inner lock housing 16. The lower adaptor housing 21 is aluminum or zinc to help transfer heat to a metal container that the invention may be attached to. Since most containers are metal, they can act as a heat sink. However, housing 16 may be made out of any composite material or other that is suitable for the application.

Figure 15:
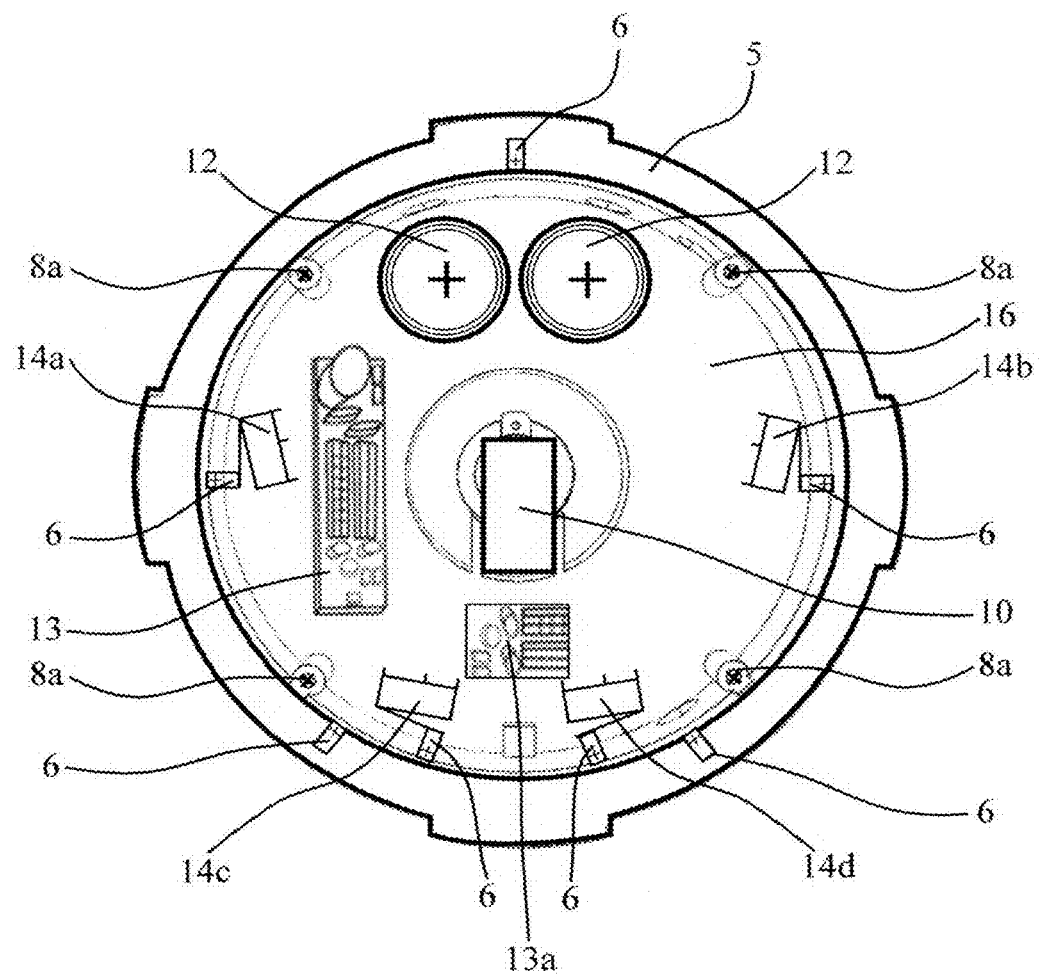
FIG. 15 is a top view of lock housing 16 with the lid removed depicting the electrical components and placement of magnetically capped switches.

The lid 9 for the lock housing is secured by screws 8 to receptacles 8a of FIG. 15. The lid 9 has a dowel pin 18 suitably positioned, protruding from the top that lines up with a groove 31a of FIG. 15 located in underside of the outer housing 5 controlling rotary movement of the outer housing 5 relative to the lock housing 16. The semi-circular raised area 9a of FIG. 17 on the top center of the lid 9 interfaces with the recessed area 26 in the underside of the cap 5 (See FIG. 16).

Figure 28:
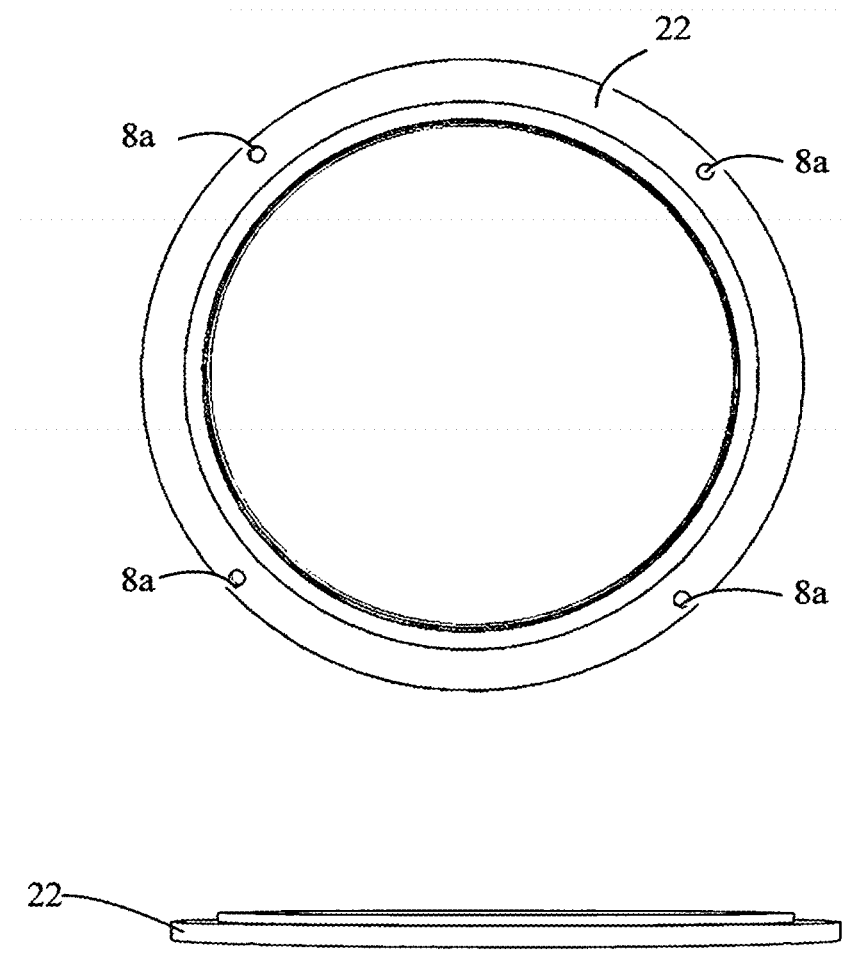
FIG. 28 is the top view of the ring lip that screws to the bottom of the cap 5 via the 4 holes shown.

The bottom views of FIGS. 09 and 10 securing the inner housings 16 and 21 depicts the attachment of ring lip 22 of FIG. 28 with four screws 8 thereby preventing the cap 5 from being lifted or pried apart from the inner housings after attachment to a filler neck. The ring lip 22 also prevents jamming of a pry device from impinging the inner housings 16 and 21 so as to allow uninterrupted frictional rotation of the cap. The outer housing cap 5 can be constructed of aluminum or any other composite material, rust resistant, and strong enough to prevent vandalism and not be detrimental to its functionality.

Coupler engagement of FIG. 22 comprises of only a compression spring loaded coupler 20 movable between an extended, engaged position of FIG. 22. and retracted disengaged position of FIG. 21. The sole operation of the servo is disengagement of the coupler by a quarter turn rotation of the offset spline adaptor of FIG. 11. Compression spring 19 of FIGS. 13 and 22 independently extends providing sufficient force to engage the inner housings 16 and 21 thereby saving huge amounts of battery life. The spring loaded coupler 20 will always be disposed in the extended position, forcibly connected to the outer housing when the security device is unlocked (See FIGS. 13 and 22). When the spring loaded coupler 20 is positioned in the retracted configuration, of FIGS. 12 and 21, (compressed by servo rotation), the security device is in its disengaged, locked configuration. Disengaged, the cap may be unmonitored without fear of break-in; accordingly, the outer housing 5, is frictionally free to slowly rotate about, and is not in concert with the inner housings 16 and 21. (See FIG. 08) Therefore, any rotation of the outer housing 5 will not cause a rotation of the inner housings of FIG. 01 or FIG. 02. It is possible but impractical that servo 10 can be kept in the unlocked position at all times but it is not energy efficient. During engagement spring 19 extends forcing coupler 20 into corresponding female slots in the mounting adaptor housing 21 thereby engaging the housings thereby allowing simultaneous rotation and therefore be in an unlocked mode in accordance of the embodiments of the present invention.

Figure 14:
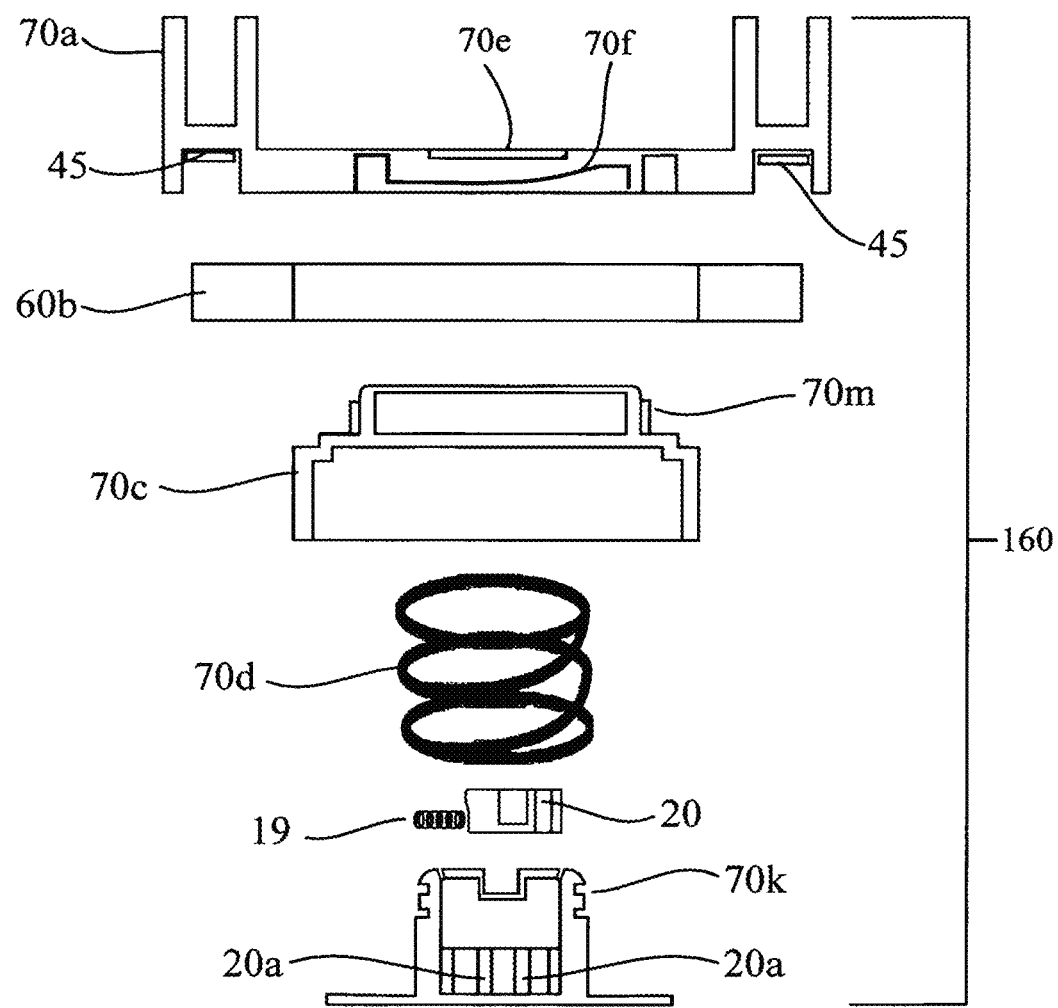
FIG. 14 is an exploded cutaway side view of the interchangeable bayonet attachment means of bracket 160.

FIG. 25 is a side view of the interchangeable bayonet attachment means 60b of FIG. 26 whereby exploded cutaway view bracket 160 of FIG. 14, depicts a cutaway exploded view of FIG. 25 whereby latching arm 60b is rotated for entrance into a bayonet filler neck prior to attachment rotation. The assembly of FIG. 14 is secured by lip ring 22 of FIGS. 09 and 28; sealed by 45 a rubber airtight seal. The top part of compression spring receiver 70k (See FIG. 25) snap locks the exploded view components of FIG. 14 into engagement after assembly. Guiding post 70m also depicted in the assembled cutaway view of FIG. 29 rides under and tangent to ramp 70f and during rotational attachment ramp 70f drives the latching arm 60b downward compressing spring 70d of FIG. 14 thereby providing clearance during rotation. Ramp 70f is situated in the inner circumference of 70a and is better seen in FIG. 14. Termination point of ramp 70f allows compression spring 70d to extend allowing latching arm 60b to return into airtight attachment by utilizing the force of spring 70d of FIG. 29 (represented by black dots).

Figure 29:
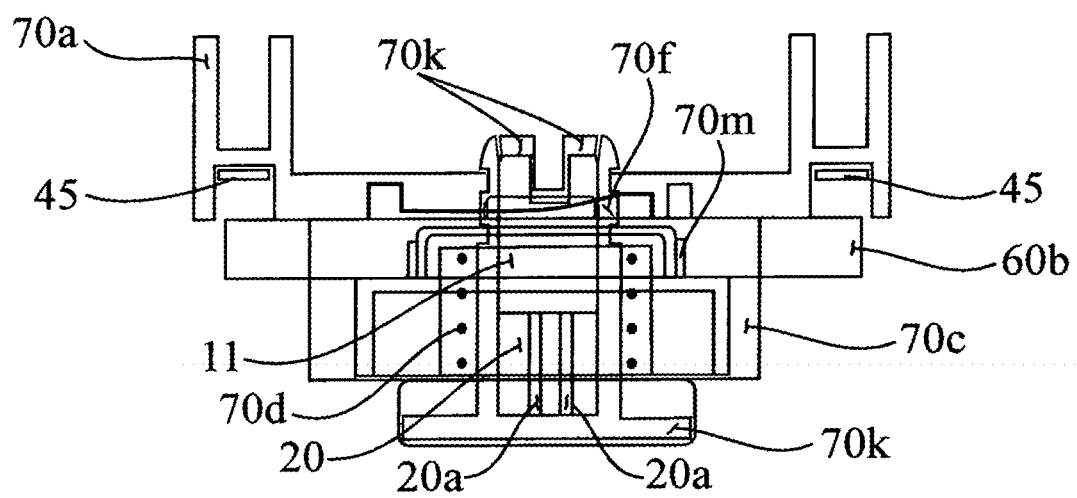
FIG. 29 is a cutaway side view of the bayonet attachment adaptor that can be used in place of the threaded type of attachment adaptor during attachment to a bayonet filler neck.

FIG. 29 is a cutaway view of the assembly of the bayonet mounting adaptor comprising 70a, lateral positioning guide post for fitment into cap 5, rubber seal 45, snap lock 70k, ramp area 70f, ramp riding post 70m, spline adaptor 11, rotary latching arm 60b, compression loading spring: illustrated by dots, spring cover 70c, spring receiver 70k, spring loaded coupler 20, vertical male post 20a. The entire assembly suitably positioned into the bottom area of cap 5 replacing the threaded adaptor when required for attachment to a bayonet filler neck and secured by ring lip 22 of FIG. 09.

FIG. 20 is a side view of bracket 300 depicting a simple reference view the interchangeable bayonet attachment adaptor hovering above a cutaway view of a bayonet filler neck prior to insertion and rotating attachment arm 60b.

Figure 20A:
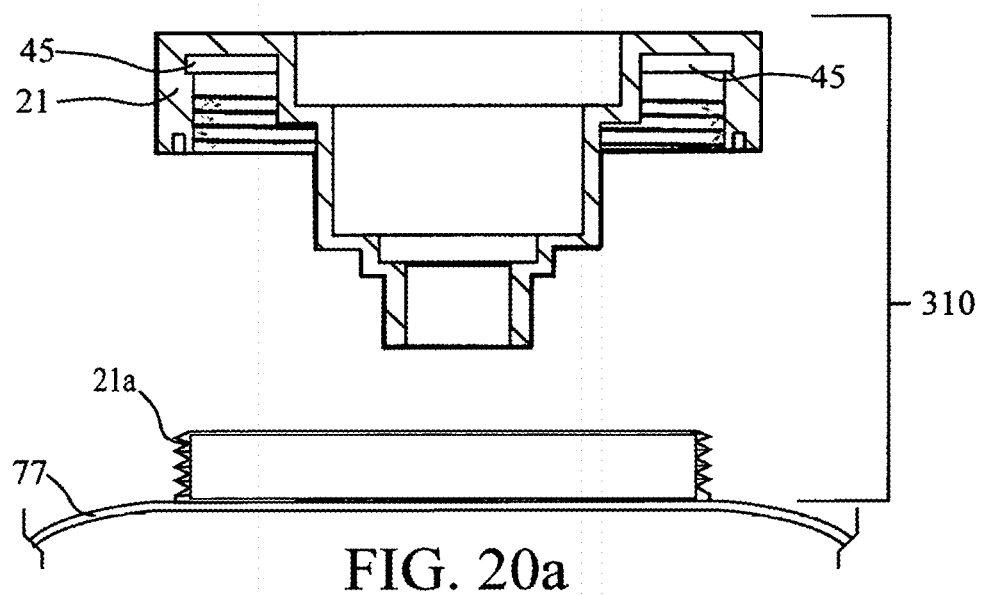
FIG. 20a depicts an interchangeable adaptor housing which can be swapped out for the bayonet adaptor attachment housing of FIG. 20 when fitment is required for a threaded adaptor.

FIG. 20a is cutaway side view of bracket 310 the alternate/interchangeable lower attachment housing showing how it attaches to a threaded filler neck.

Figure 31:
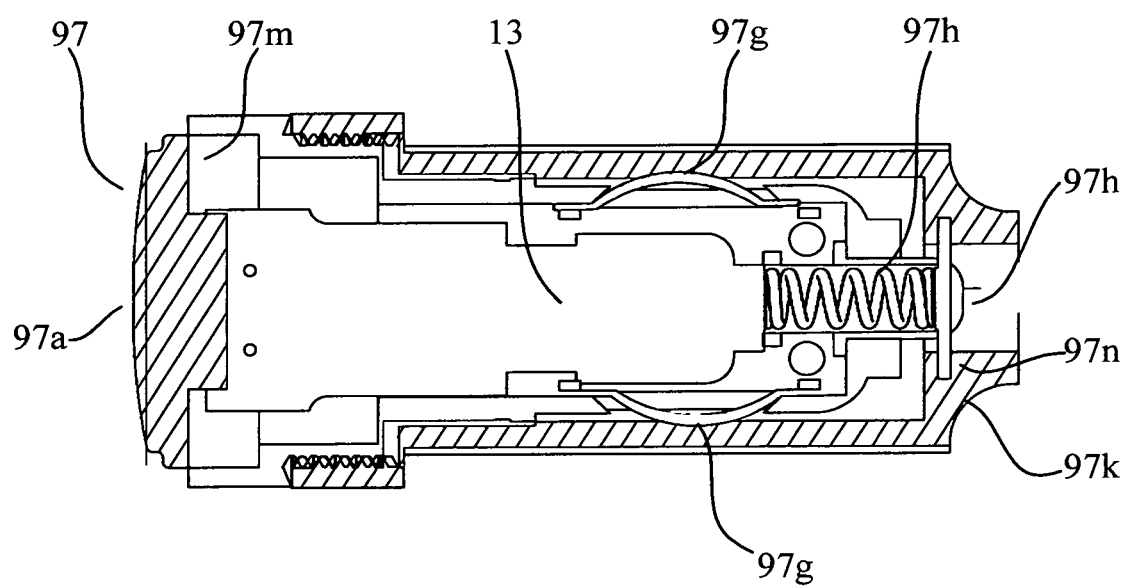
FIG. 31 Depicts a cutaway view of an R F transmitter configured as a cigarette lighter plug comprising electrical components along with regular cigarette lighter standard components encased by a cigarette lighter power socket that is only used when permanently mounting through a panel.

FIG. 31 Is a cutaway drawing of an R F transmitter 97 of FIG. 1, FIG. 2 and FIG. 31 configured to look like a cigarette lighter plug comprising a switch 97a into cap 97b that activates the circuitry 13 of R F transmitter 97 further comprising a glamour cap 97c for use when not in-dash mounted, socket; 97k further comprising ground springs 97g compression power spring 97h, electronic circuitry 13a, outer housing 97m, 12 volt contact button 97j, power button spring 97h, and 12 volt contact plate 97n.

Said R F transmitter providing a means to block the locking function when the R F transmitter switch is depressed thereby keeping the cap unlocked allowing authorized removal.

Figure 32:
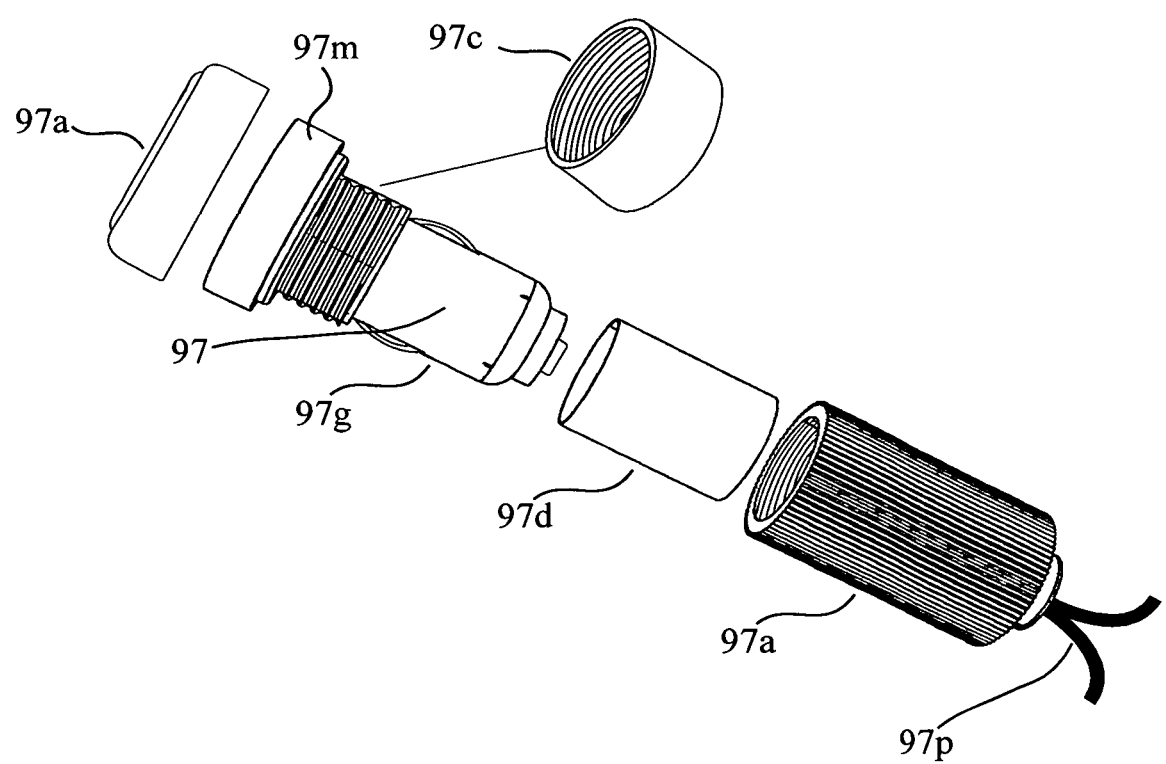
FIG. 32 Is an exploded view of the 5 major components of the R F transmitter further detailing the cap switch that attaches to the cigarette power plug; the glamor cap that covers the threads when not using the power socket, the brass ground tube, the power plug can be used without the power socket when plugged into any 12 volt power socket and the 12 volt power socket used for permanent panel attachment.

FIG. 32 is an exploded assembly drawing depicting the R F transmitter 97 whereby the major components are the switch cap 97a, glamour cap 97c used to cover threads on 97m during portable use, brass insert ground tube, and power socket means 97k used only when permanent panel mounting is required comprising hookup wires 97p.

The scope of this invention is intended to cover any suitable water, fuel or hydraulic fluid container locking means. While the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A battery powered keyless locking cap configured for attachment to a container and remaining in an unlocked configuration after attachment to the container, comprising;
    (a) a cap outer housing with a generally annular structure;
    (b) a lock housing; the lock housing comprising a logic controller, a power source, a spline adaptor and a servo, solenoid, or other motorized device, where the lock housing is covered by the cap outer housing, where the power source provides power to the servo, solenoid or other motorized device,
    (c) an attachment adaptor; the attachment adaptor comprising one or more recessed female slots inscribed into an inner diameter of the attachment adaptor; where the attachment adaptor is covered by the cap outer housing,
    (d) a spring loaded coupler, the spring loaded coupler comprising one or more vertical male posts, a spring retainer slot, a slot, and a compression spring; where the compression spring is placed between the attachment adaptor and the spring loaded coupler, where the compression spring is located within the spring retainer slot, where the one or more vertical male posts are adapted to fit within the one or more recessed female slots of the attachment adaptor, where the compression spring pushes the spring loaded coupler so that the one or more vertical male posts engage into the one or more recessed female slots inscribed into the inner diameter of the attachment adaptor, allowing the cap outer housing to unlock the battery powered keyless locking cap from the container,
    (e) where the servo, solenoid, or other motorized device is positioned to rotate the spline adaptor,
    (f) where the spline adaptor connects to the slot of the spring loaded coupler,
    (g) where the spline adaptor compresses the compression spring when the servo, solenoid, or other motorized device rotates the spline adaptor, thereby disengaging the one or more vertical male posts of the spring loaded coupler from the one or more recessed female slots of the attachment adaptor so that the cap outer housing rotates freely frictionally around the lock housing, preventing the cap outer housing from unlocking and removing the battery powered keyless locking cap from the container.

2. The keyless locking cap of claim 1 further comprising an R F transmitter configured to look like a cigarette lighter power plug that can be plugged into a power socket, the R F transmitter comprising a switch, such that when activated, the R F transmitter transmits a bypass code that blocks the locking function thereby allowing the keyless locking cap to be removed.

3. The keyless locking cap of claim 1 further comprising a semi-circular slot in the underside of the cap outer housing, a dowel pin protruding therefrom and suitably positioned in the lid of the adjacent lock housing to ride into said semi-circular slot having sufficient torque to remove the keyless locking cap and the entry of pin code numbers are noticeably heard and felt when end points of the semi-circular slot are tapped by the dowel pin.

4. The keyless locking cap of claim 1 further comprising an R F transmitter configured to look like a cigarette lighter power plug that can be plugged into a power socket, the R F transmitter comprising a switch and a permanent dash mounting provision such that the permanent dash mounting provision can be hard wired to an ignition switch or any convenient power source such that when activated, the R F transmitter transmits a bypass code that blocks the locking function thereby allowing the keyless locking cap to be removed.

5. The keyless locking cap of claim 3, the keyless locking cap further comprising one or more visual indicators, where the one or more visual indicator are connected to the logic controller.

6. The keyless locking cap of claim 1 further comprising a rotary pin code entering lock whereby a series of preprogrammed pin code numbers dialed by rotating the cap outer housing around the lock housing in a prescribed manner whereby corresponding magnets in the inner area of the cap outer housing, operatively positioned to activate like charged magnetically capped micro switches corresponding to and adjacent to the outer perimeter of the lock housing such that when activated, enter a recognized series of pin code numbers thereby activating the logic controller not to initiate the locking sequence so that the cap outer housing remains in concert with the lock housing thereby allowing removal and or replacement of the keyless locking cap.

7. The keyless locking cap of claim 1 further comprising a mode hereby referred to as frictionally controlled rotation around the inner axis thereby preventing unwanted removal of the cap.

8. The keyless locking cap of claim 3 further comprising a built in timer circuit that rotates the servo, solenoid, or other motorized device thereby forcing the spring loaded coupler into an unlocked or coupled position thereby allowing the keyless locking cap to be re-attached.

9. The keyless locking cap of claim 7 further providing about 8.9 pounds of frictional torque to simultaneously rotate the cap outer housing and lock housing but not enough torque to override the attachment force of the attachment adaptor when the invention is locked and attached to the container.

10. The keyless locking cap of claim 3, where the end points of the semi-circular slot act as a dowel pin stopping point when rotating the cap outer housing counterclockwise or clockwise thereby enabling the cap outer housing to be rotated in concert with the lock housings when the keyless locking cap is in the unlocked mode thereby allowing removal and replacement of the keyless locking cap.

11. The keyless locking cap of claim 6 further comprising a backup lock method that can be used to unlock the keyless locking cap for removal and replacement if a key fob, or remote transmitter is lost, misplaced or in the event of a failed transmitter.

12. The keyless locking cap of claim 1 that has a completely continuous, uninterrupted exterior surface to protect against water, road grime, crazy glue, picks or probes into the locking mechanism lacking a keyway or any exterior means to gain access to the interior.

13. The keyless locking cap of claim 6, where the cap outer housing comprises a continuous unbroken and uninterrupted outer surface that gives no indication to an unwanted user that the cap has a locking provision.

14. The keyless locking cap of claim 1 where the keyless locking cap is normally in an unlocked mode so that if the power source or the logic controller fails the keyless locking cap can be removed to change the power source or the logic controller or otherwise provide access.

15. The keyless locking cap of claim 9 that frictionally rotates about an interior axis when in a locked mode further serving to control the speed of rotation thereby preventing rapid rotation.

16. The keyless locking cap of claim 1 further comprising opposing magnets such that when the cap outer housing is slightly rotated about the lock housing the opposing magnets pass each other and activate a power switch that initiates the locking sequence simultaneously locking the keyless locking cap.

17. The keyless locking cap of claim 1 further comprising an independently operating compression spring loaded coupler that is located in the lock housing whereby the compression spring forces engagement between the lock housing and the attachment adaptor.

18. The keyless locking cap of claim 17, where the independently operating spring loaded coupler whose function is to further save energy by keeping the keyless locking cap in an unlocked mode while all power is off.

19. The keyless locking cap of claim 15 further comprising a default return spring strategically located between the lid of the lock housing and the underside of the cap outer housing further saving energy, by returning the keyless locking cap to a default power off position.

20. The keyless locking cap of claim 1, where the attachment adaptor is interchangeably attached to the lock housing where the attachment adaptor is configured to attach to a bayonet type or threaded type container.

21. The keyless locking cap of claim 1, where the attachment adaptor and the lock housing fits inside the container.

22. The keyless locking cap of claim 1 comprising opposing magnets such that when the cap outer housing is slightly rotated it simultaneously locks the keyless locking cap.

23. The keyless locking cap of claim 19 that uses no energy by remaining in an unlocked mode until the cap outer housing is slightly rotated when trying to remove the keyless locking cap from the container.

24. The keyless locking cap of claim 1, wherein the cap outer housing comprising annular walls enveloping the lock housing adjacent to the attachment adaptor for attachment to either a bayonet type or threaded type container.

25. The keyless locking cap of claim 20 further comprising a rubber gasket suitably positioned in the lower portion of the cap outer housing and within the annular walls of the cap outer housing providing a universal fitment to bayonet type or threaded type containers, providing an airtight seal.

26. The keyless locking cap of claim 9 further comprising an o ring working in concert with a force stabilizing grease such that in extreme temperature variations, the grease viscosity remains constant and does not tend to liquefy; said grease sandwiched between the adjacent surfaces of the lock housing and the attachment adaptor; further providing a stabilizing frictional resistance.

27. The keyless locking cap of claim 1 further comprising a timer circuit that rotates the servo, solenoid, or other motorized device thereby allowing the keyless locking cap to return to an energy free unlocked mode of operation thereby allowing the keyless locking cap to be attached to the container.

28. The keyless locking cap of claim 1 whereby the logic controller is configured to maintain the keyless locking cap in locked subsequent to attachment to the container.

* * * * *